United States Patent
Macko et al.

(10) Patent No.: US 9,734,607 B2
(45) Date of Patent: Aug. 15, 2017

(54) GRAPH PROCESSING USING A MUTABLE MULTILEVEL GRAPH REPRESENTATION

(71) Applicant: Oracle International Corporation, Redwood City, CA (US)

(72) Inventors: Peter Macko, Arlington, MA (US); Virendra J. Marathe, Florence, MA (US); Margo I. Seltzer, Lincoln, MA (US)

(73) Assignee: Oracle International Corporation, Redwood City, CA (US)

( * ) Notice: Subject to any disclaimer, the term of this patent is extended or adjusted under 35 U.S.C. 154(b) by 305 days.

(21) Appl. No.: 14/483,052

(22) Filed: Sep. 10, 2014

(65) Prior Publication Data

US 2016/0071233 A1    Mar. 10, 2016

(51) Int. Cl.
| | |
|---|---|
| G06F 7/00 | (2006.01) |
| G06F 17/30 | (2006.01) |
| G06T 11/20 | (2006.01) |
| G06F 17/10 | (2006.01) |

(52) U.S. Cl.
CPC ............ *G06T 11/206* (2013.01); *G06F 17/10* (2013.01); *G06F 17/30958* (2013.01)

(58) Field of Classification Search
None
See application file for complete search history.

(56) References Cited

U.S. PATENT DOCUMENTS

| | | | | |
|---|---|---|---|---|
| 8,965,849 | B1* | 2/2015 | Goo | G06F 17/30327 707/634 |
| 2007/0198621 | A1* | 8/2007 | Lumsdaine | G06F 17/16 708/200 |
| 2007/0250480 | A1* | 10/2007 | Najork | G06F 17/30864 |
| 2014/0244657 | A1* | 8/2014 | Mizell | G06F 17/30321 707/743 |

(Continued)

OTHER PUBLICATIONS

S. Hong, H. Chafi, E. Sedlar, and K. Olukotun. Green-Marl: a DSL for easy and efficient graph analysis. In ASPLOS, pp. 349-362. ACM, 2012.

(Continued)

*Primary Examiner* — Taelor Kim
*Assistant Examiner* — David T Brooks
(74) *Attorney, Agent, or Firm* — Robert C. Kowert; Meyertons, Hood, Kivlin, Kowert & Goetzel, P.C.

(57) ABSTRACT

A mutable multilevel data structure representing a graph structure may include multiple read-only levels and a single writable level. Each read-only level may include a vertex table (with references to edge tables on the same level or a different level containing elements of adjacency lists for some vertices) and an edge table (with elements of adjacency lists that changed since the previous read-only level). A hybrid variant may switch between a performance-optimized variant (whose edge tables include complete adjacency lists for vertices whose edge sets were modified) and a space-optimized variant (whose edge tables include only newly added adjacency list elements). The vertex tables and/or the writable level may be implemented using copy- (Continued)

on-write arrays, each including an indirection table and multiple fixed-sized data pages. Computations may be run on the read-only levels or on the writable level and read-only levels.

20 Claims, 15 Drawing Sheets

(56) References Cited

U.S. PATENT DOCUMENTS

| | | | |
|---|---|---|---|
| 2015/0310644 A1* | 10/2015 | Zhou | G06F 17/16 345/440 |
| 2015/0317334 A1* | 11/2015 | Raghunathan | G06F 17/30292 707/743 |
| 2015/0379054 A1* | 12/2015 | Kernert | G06F 17/16 707/625 |

OTHER PUBLICATIONS

H. V. Jagadish, P. P. S. Narayan, S. Seshadri, S. Sudarshan, and R. Kanneganti. Incremental organization for data recording and warehousing. In VLDB, pp. 16-25. Morgan Kaufmann, 1997.

A. Kyrola, G. Blelloch, and C. Guestrin. GraphChi: large-scale graph computation on just a PC. In Proceedings of the 10th USENIX Conference on Operating Systems Design and Implementation, OSDI, pp. 31-46, Berkeley, CA, USA, 2012. USENIX Association.

Lin, Z., Chau, D.H.P., Kang, U.: Leveraging memory mapping for fast and scalable graph computation on a pc. In: BigData Conference, pp. 95-98 (2013).

P. E. O'Neil, E. Cheng, D. Gawlick, and E. J. O'Neil. The log-structured merge-tree (LSM-tree). Acta Informatica, vol. 33 (issue 4), pp. 351-385, 1996.

V. Prabhakaran, M. Wu, X. Weng, F. McSherry, L. Zhou, and M. Haridasan. Managing large graphs on multi-cores with graph awareness. In Proceedings of the 2012 USENIX Conference on Annual Technical Conference, USENIX ATC, Berkeley, CA, USA, 2012. USENIX Association.

B. Shao, H. Wang, and Y. Li. Trinity: A distributed graph engine on a memory cloud. In Proceedings of the 2013 ACM SIGMOD International Conference on Management of Data, SIGMOD '13, pp. 505-516, New York, NY, USA, 2013. ACM.

K. Bharat, A. Z. Broder, M. R. Henzinger, P. Kumar, and S. Venkatasubramanian. The connectivity server: Fast access to linkage information on the web. Computer Networks and ISDN Systems, vol. 30 (Issues 1-7): pp. 469-477, Apr. 1, 1998.

* cited by examiner

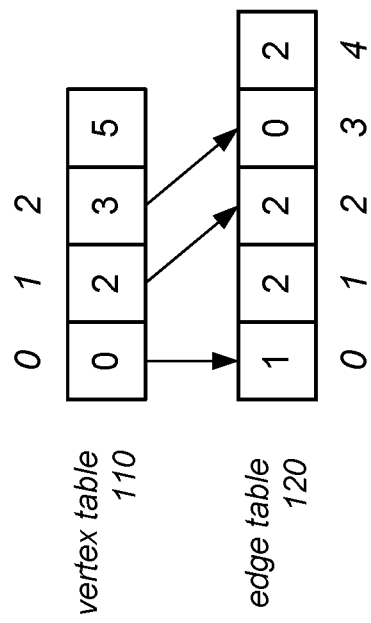
FIG. 1C
(Prior Art)
FIG. 1B
(Prior Art)
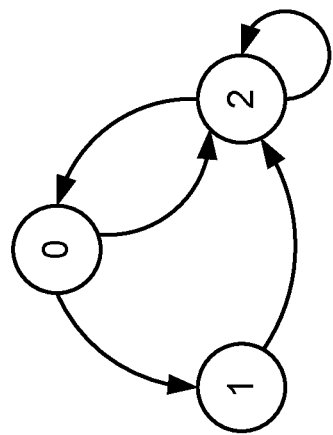
FIG. 1A
(Prior Art)

GRAPH PROCESSING USING A MUTABLE MULTILEVEL GRAPH REPRESENTATION

BACKGROUND

Field of the Disclosure

This disclosure relates generally to graph analytics, and more particularly to systems and methods for performing graph processing operations using mutable multilevel data structures to represent the target graph structures.

Description of the Related Art

The importance of graph analytics is growing, but so is the size and richness of the data being analyzed. In addition, graph analytics and other graph processing computations are typically highly dynamic processes, in that both the graph structure and its node and/or edge properties can change, sometimes quite rapidly. The dynamic nature of today's graphs is ill-suited for Compressed Sparse Row (CSR) representation, which is one of the most popular data structures used today for representing graphs for in-memory analytics applications.

Previous attempts have been made to create mutable CSR-based representations, such as delta maps and log-based representations, but both of these have their shortcomings. Delta maps, which store modifications in a write-optimized representation, either slow down a computation (e.g., if the computation accesses the write-optimized representation) or require rebuilding the entire representation (e.g., to obtain up-to-date results without accessing the slow write-optimized representation). Log-structured approaches take up large amounts of memory and require periodic merges to cap memory usage, requiring a space/time trade-off.

Data structures other than CSR-based representations have been used to represent graph structures. For example, systems that prioritize updates and/or that are optimized for online transaction processing (OLTP) workloads or OLTP-like workloads typically store adjacency lists in separate arrays. One existing system stores the adjacency lists in separate objects called "cells," which the system stores compactly back-to-back in a circular buffer. This system grows the cells by reallocating them at the head of the buffer, and it compacts the buffer by periodically moving objects from the tail to the head. This system supports low-latency online queries by providing fast random access to the adjacency lists in addition to efficient offline analytics, which uses a vertex-centric computational model. It optimizes message passing by identifying "hub" vertices with a large number of connections.

Another existing system represents graphs using compressed, partitioned bitmaps, which enable the database to efficiently combine multiple adjacency lists using set operations. In this system, the bitmaps are chunked into 32-bit words, and all nonzero chunks are stored in a balanced tree that maps the offset of a chunk to the chunk itself. The result is a compact data structure optimized for out-of-core computation with reasonable in-memory performance, but it is not as fast as dedicated in-memory systems. Dense graphs, in which the number of edges approaches the square of the number of vertices, are often stored using an uncompressed adjacency matrix. However, real-world graphs on which complex analytics are performed are rarely that dense. Yet another existing system enables computation on a distributed, constantly changing graph by providing a snapshotting method based on vector clocks. It enables incremental computation by updating the computation results based on recent changes in the graph as reflected in new snapshots.

SUMMARY

The systems and methods described herein may in some embodiments be used to implement a mutable multilevel data structure that represents a graph structure. This representation may be well suited for use in graph analytics and other graph processing computations, and may offer improved performance and/or space utilization over existing graph representations. The mutable multilevel data structure may include multiple read-only levels and a single writable level. Each read-only level may include a vertex table and an edge table. The vertex table may include references to the edge table on the same level and/or an edge table on a different level, each of which contains elements of the adjacency list for one or more vertices of the graph structure. The edge table may include elements of the adjacency lists that have changed since the immediately previous read-only level was created (e.g., for one or more vertices of the graph structure). In some embodiments, the edge table may also include a deletion vector (indicating whether or not various edges have been deleted and/or the level at which they were deleted), an adjacency list length (for each vertex that is represented by an element in the vertex table), and/or a directed or undirected vertex degree (for each vertex that is represented by an element in the vertex table). In some embodiments, the lowest read-only level (level 0) may represent a consistent snapshot of the entire graph structure at a specific point in time.

The mutable multilevel data structures described herein include several variants, each of which may be well suited for use with different classes of computations or in systems with different resource constraints or policies. For example, the edge tables at each level of a performance-optimized variant of the mutable multilevel data structure may include complete adjacency lists for vertices whose edge sets were modified since the immediately previous read-only level was created, while the edge tables of a space-optimized variant of the mutable multilevel data structure may include only those elements of the adjacency lists that were added since the immediately previous read-only level was created. In other words, the amount of edge set information that is copied to each new read-only level of the mutable multilevel data structure when it is created may vary between different variants of the mutable multilevel data structure.

In some embodiments (e.g., in a hybrid variant of the mutable multilevel data structure), different amounts of edge set information may be stored at each new read-only level of the mutable multilevel data structure for different vertices of the graph structure and/or under different circumstances. For example, when creating a new read-only level of the mutable multilevel data structure, a determination may be made, for each vertex represented by an element at the new read-only level, of whether to copy the entire adjacency list for the vertex to the new read-only level or to copy to the new read-only level only the elements of the adjacency list for the vertex that have been modified since the immediately previous level was created based on a configuration parameter value indicating selection of one of two or more supported copy policies, a comparison between a degree of the vertex and a pre-determined degree threshold (or cutoff) value, and/or other criteria.

The vertex tables and/or the writable level may be implemented using copy-on-write arrays, each of which includes an indirection table and multiple fixed-sized data pages, in some embodiments. Computations of a graph processing application may be run on one or more of the read-only levels or on both the single writable level and one or more of the read-only levels, depending on whether up-to-date information is required, performance constraints, resource constraints, and/or other factors. In some embodiments, a graph analytics or graph processing application may include, or make calls to, various functions, operations, or methods of a graph processing module in order to reconstruct an adjacency list for a given vertex of a graph structure that is represented by one of the of the mutable multilevel data structures described herein, to create a new read-only level in such a structure, to merge two read-only levels of such a structure, and/or to perform other operations that target the mutable multilevel data structure. In some embodiments, the graph processing module may be a component of the operating system of the computer system on which the mutable multilevel data structure is maintained and/or on which the graph analytics or graph processing application is executing, or may be a component of a shared library on the computer system. In some embodiments, the graph processing module may perform these and/or other operations in response to the computer system receiving requests to perform computations on a graph structure that is represented by one of the of the mutable multilevel data structures described herein, where the request includes an explicit or implicit request to perform the operations implemented by the graph processing module.

BRIEF DESCRIPTION OF THE DRAWINGS

FIGS. 1A-1C illustrate three different representations of an example graph structure, according to one embodiment.

Figure 2A:
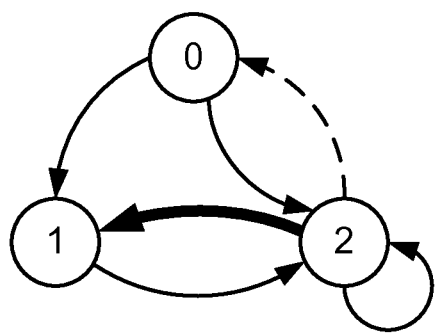
FIGS. 2A-2C illustrate how changes made to a graph structure may be reflected in the vertex table and edge table of a log-based CSR representation of that graph structure, according to one embodiment.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

The systems and methods described herein may, in various embodiments, be used to implement multi-version data structures suitable for graph analytics. These data structures, which may be built on compressed sparse row (CSR) representations (or CSR-like representations) of graph structures, may be mutable multilevel data structures that enable applications to perform graph analytics or otherwise process graph structures with higher performance and/or space utilization than are possible with existing CSR-like representations. In various embodiments, the mutable multilevel data structures described herein may provide a solution to the problem of mutability in CSR representations that subsumes earlier attempts to add mutability to CSR representations through parameterization. A space-optimized variant of these mutable multilevel data structures may be suitable for use in a large class of real-world algorithms, delivering both good performance and memory usage, while a performance-optimized variant or a hybrid variant may be well suited for use in other cases.

Compressed Sparse Row Representation

Existing compressed sparse row representations of graphs are in common use, and they typically provide a cache friendly and performance-efficient representation for a variety of graph structures. However, a significant drawback of these CSR representations is that they are not mutable (i.e., they provide a read-only representation of a graph structure).

In some embodiments, the techniques described herein may be used to create and use a mutable multilevel variant of the CSR representation (e.g., one that is suitable for use in a variety of workloads) with minimal cost.

A graph structure with n vertices (sometime referred to herein as "nodes") may be represented as an n×n sparse matrix, M, in which element Mij is nonzero if and only if there is an edge from node i to node j. The undirected edge from node i to node j may be represented with nonzero in both Mij and Mji. A CSR representation may provide an efficient encoding of the rows of this sparse matrix and may facilitate the rapid identification of the outgoing edges for each node of the graph. A compressed sparse column (CSC) representation is a similar representation that may be used to encode the incoming edges of a node. A typical implementation of a CSR representation may consist of the following two tables, each implemented as an array:

The vertex table (V) is an array of (n+1) elements that maps a vertex identifier (e.g., a vertex ID value between 0 and (n−1)) to the identifier of its first outgoing edge. The identifier of the first outgoing edge also serves as an index into the Edge Table, identifying the position within the edge table at which the corresponding adjacency list begins. The number of items in the $i^{th}$ adjacency list may be calculated as $(V_{i+1}-V_i)$, and the last element in the vertex table is set to the size of the Edge Table.

The edge table (E) stores each node's adjacency list in consecutive elements in a single array. Each entry in the array maps an edge identifier to its corresponding destination vertex identifier.

A typical compressed sparse row representation may be further described by way of the example illustrated in FIGS. 1A-1C. FIG. 1A illustrates an example graph structure that (at some time, $T_0$) includes three vertices (shown as three nodes labeled 0, 1, and 2) and five edges between the vertices (e.g., one from vertex 0 to vertex 1, one for vertex 0 to vertex 2, one from vertex 1 to vertex 2 one from vertex 2 to vertex 0, and one from vertex 2 to itself). FIG. 1B illustrates the example graph of FIG. 1A represented as a sparse matrix. In this example, a "1" in any element indicates the existence of an edge from the vertex corresponding to the row in which the element is located and the vertex corresponding to the column in which the element is located. For example, row 0 of the sparse matrix includes a "1" in column 1 (representing the edge from vertex 0 to vertex 1) and a "1" in column 2 (representing the edge from vertex 0 to vertex 2).

FIG. 1C illustrates the example graph of FIG. 1A represented as encoded using a CSR representation. In this example, the CSR includes a vertex table 110 and an edge table 120. In this example, each element of vertex table 110 corresponds to a vertex of the graph shown in FIG. 1A and its value is an index into edge table 120 indicating where the adjacency list for the corresponding vertex begins in edge table 120. For example, the third element of vertex table 110 (labeled element 2) indicates that the adjacency list for vertex 2 (which includes the values 0 and 1) begins at index 3 (i.e., the fourth element) in edge table 120. In other words, edge table 120 shows that the endpoints of the outgoing edges from vertex 2 are vertices 0 and 2. The identifiers of these edges are 3 and 4, which are their respective indices in edge table 120. In this example, the length of the adjacency list for vertex 2 (which is 2) can be determined from the contents of vertex table 110. This is indicated in the vertex table as the difference between the edge table index value for vertex 3 (which does not yet exist in the graph) and the edge table index value for vertex 2. In this example, the edge table index value for vertex 3 (i.e., the value 5) is stored in the fourth element of vertex table 110, and its adjacency list (once it exists) would be indexed in edge table 120 at index 5. Here, the edge table index value for vertex 2 (i.e., the value 3) indicated that the adjacency list for vertex 2 begins in edge table 120 at index 3. In other words, the length of the adjacency list for vertex 2 may be found as (vertex table element 3−vertex table element 2, or 5−3=2).

While there are many approaches to storing properties associated with the elements of a graph structure in a CSR representation (or a CSR-like representation), node properties are commonly stored in an additional flat array that is parallel to the vertex table, so that a property associated with a given node i is stored in the additional flat array at a position referenced by an index value of i. Similarly, edge properties are commonly stored in an additional flat array that is parallel to the edge table.

One way to add mutability to a CSR representation of a graph structure is by augmenting it with a delta map, which is a writeable data structure that stores the difference between the CSR representation (which is a read-only representation) and the current state of the graph structure. For example, the delta map may be implemented as a hash table that maps node IDs to growable arrays of recently added or removed edges, but other implementations are possible. In this representation, graph analytics and other computations are typically run against the base CSR representation, which is a read-only representation that does not necessarily reflect the current state of the graph structure. While this may be acceptable for some workloads (e.g., data that is somewhat out of date may be sufficient for particular computations), other workloads may require fresher data.

With this representation, in order to run graph analytics and other computations against up-to-date data, the system must run the computation on the combination of the CSR representation and the delta map. Note, however, that delta maps are typically not as cache friendly as the CSR representation, which can add cost and may cause these computations to be slower. While a computation that runs exclusively on the CSR representation may be significantly faster, in order to achieve that speed for computations running against the most up-to-date data, the system would first need to rebuild the entire data structure.

Another way to modify the CSR representation to add mutability is to modify the CSR directly by treating the edge table of the CSR representation as a log. In this log-based variant of the CSR representation, the edge table may be pre-allocated with free space at the end. Whenever an adjacency list is modified (such as by adding or removing an edge), the entire updated adjacency list may be appended to the end of the edge table, and the pointer in the vertex table may be updated accordingly. For example, if the edge set (i.e., the adjacency list) for a particular vertex is updated in the graph structure, then an updated clone of that edge set may be appended to the edge table, and the edge index for the corresponding entry in the vertex table (i.e., the entry corresponding to that vertex) may be updated to reflect the change. This approach, in which mutations that are applied to vertices and edges are appended to the log, may preserve some of the cache-friendliness of the base CSR representation, but the log can grow very large. In this representation, if (or once) there is no additional space in the edge table, space for the edge table must be reallocated.

The performance of this log-based variant of the CSR representation may be very good on the read-only workloads. However, updating the graph may create "holes" in the edge table, which waste space. In other words, if the adjacency lists are frequently copied, this may result in the introduction of a lot of holes in the edge table and a lot of unused space. In this case, the memory space that was pre-allocated for the edge table may fill pretty quickly, and may be used relatively inefficiently. Therefore, the system may periodically perform a compaction operation (e.g., to compact the data structure in order to keep the memory overhead under control in the presence of frequent updates).

Systems built on top of log-based CSR representations often do not have a separate delta map to batch updates, especially if they were designed for data ingest in large batches. In such systems, frequent updates to the same adjacency list may result in copying a large amount of data and creating many holes in the edge table. However, this issue may be addressed by the addition of a delta map, as described above.

Figure 2B:
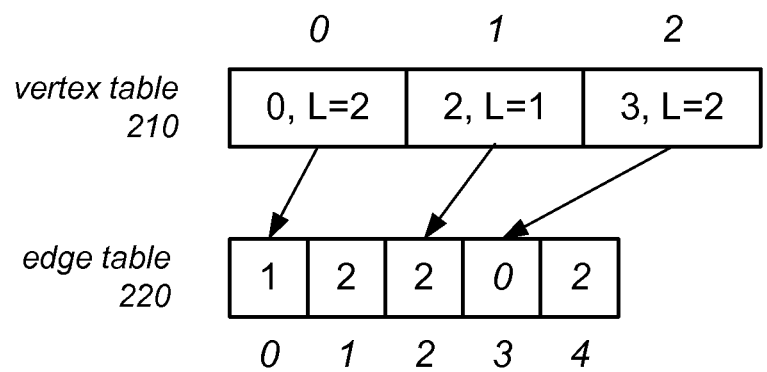
Figure 2C:
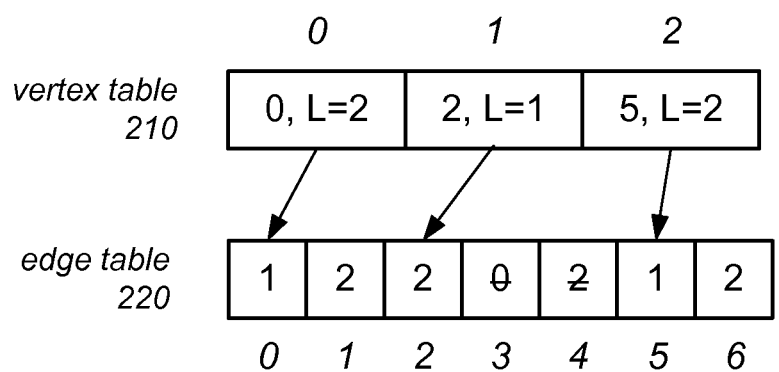

FIGS. 2A-2C illustrate how changes made to the graph shown in FIG. 1A (e.g., at some time $T_1$) may be reflected in the vertex table and edge table of a log-based CSR representation, according to some embodiments. In this example, FIG. 2A illustrates a scenario in which one edge is added to the graph shown in FIG. 1A and one edge is removed from the graph shown in FIG. 1A. More specifically, FIG. 2A illustrates the graph of FIG. 1A with the addition of an edge from vertex 2 to vertex 1 (shown as the heavy solid line from node 2 to node 1) and the removal of the edge from vertex 2 to vertex 0 (shown as the dashed line from node 2 to node 0).

In this example, FIG. 2B illustrates how the graph shown in FIG. 1A would be reflected in a log-based CSR representation of the graph prior to the changes (e.g., at time $T_0$). In this example, the log-based CSR representation of the graph includes a vertex table 210 and an edge table 220. As in the previous example, each element of vertex table 210 corresponds to a vertex of the graph shown in FIG. 1A and its value is an index into edge table 220 indicating where the adjacency list for the corresponding vertex begins in edge table 220. For example, the third element of vertex table 210 (labeled element 2) indicates that the adjacency list for vertex 2 (which includes the values 0 and 2) begins at index 3 (i.e., the fourth element) in edge table 220. In other words, edge table 220 shows that the endpoints of the outgoing edges from vertex 2 are vertices 0 and 2. The identifiers of these edges are 3 and 4, which are their respective indices in edge table 220. Note that, in this representation the length of the adjacency list cannot be calculated as the difference between two vertex table values, because sequentially numbered vertices are no longer necessarily consecutive in the edge table. Therefore, in this example, each element in vertex table 210 includes an indication of the length of the adjacency list for the corresponding vertex of the graph.

As noted above, in a log-based CSR representation, the addition or removal of an edge may be implemented by appending an updated adjacency list at the end of the edge table and updating the vertex table accordingly. In this example, FIG. 2C illustrates how the modifications to the graph of FIG. 1A that are shown in FIG. 2A would be reflected in a log-based CSR representation of the graph following the changes (e.g., at time $T_1$). In this example, the adjacency list of vertex 2 has changed, as its two outgoing edges have their endpoints at Vertices 1 and 2 instead of at vertices 0 and 2. Therefore, a new adjacency list for vertex 2 (which now includes values 1 and 2, instead of values 0 and 2) has been appended to the edge table, beginning at edge table element 5 and the vertex table value corresponding to vertex 2 (the third element of vertex table 210) has been updated to include an index value of 5 (indicating that the adjacency list for vertex 2 begins at element 5 of edge table 220).

Note that while in this example, adjacency list lengths are explicitly stored in each element of vertex table 210, other approaches to determining the lengths and/or ends of the adjacency lists are possible, in other embodiments. For example, in some embodiments, the adjacency list lengths may be explicitly stored in edge table 220, or a bit indicating the end of an adjacency list may be stored in the last element of the list (in edge table 220). However, in many cases (e.g., for a variety of workloads), better performance may be achieved in embodiments in which the adjacency list lengths are explicitly stored in the vertex table.

In some embodiments, the mutable multilevel data structures described herein may be designed in a way that allows them to perform well for a variety of workloads, including whole-graph analysis workloads and online transaction processing (OLTP) workloads. For example, the design of these mutable multilevel data structures may take a variety of factors into consideration when implementing the one or more read-only levels of the mutable multilevel data structures (e.g., one or more read-only CSR-like data structures), such as memory-efficiency, methods for indicating the ends of the adjacency lists, methods for representing deletions, etc. These and/or other considerations may also be taken into account in the design of the single writable level for the mutable multilevel data structures.

In some embodiments, the mutable multilevel data structures described herein may include variants of some of the features of CSR-like representations, delta maps, and log-structured CSR representations. More specifically, instead of maintaining a single CSR representation, they may maintain several read-only CSR-like data structures through which multi-version access to the data is enabled. In some embodiments, the lowest level of one of these mutable multilevel data structures, level 0 (L0), may be a CSR-like representation of a graph structure that stores a consistent, read-only snapshot of the entire graph as of a given time $T_0$. A CSR-like representation at each other read-only level (e.g., at each level i, where i>0), may encode the difference between the graph at times $T_{i-1}$ and $T_i$ (where $T_{i-1}<T_i$) such that, together with levels 0, ..., (i-1), it encodes a read-only snapshot of the graph at time $T_i$. In some embodiments, the last level, which may sometimes be referred to as $L_{now}$, may be a write-optimized data structure that stores the difference between the last read-only level and the current version of the graph, similar to a delta map. An example implementation of a data structure for this level is described in more detail later.

Figure 3:
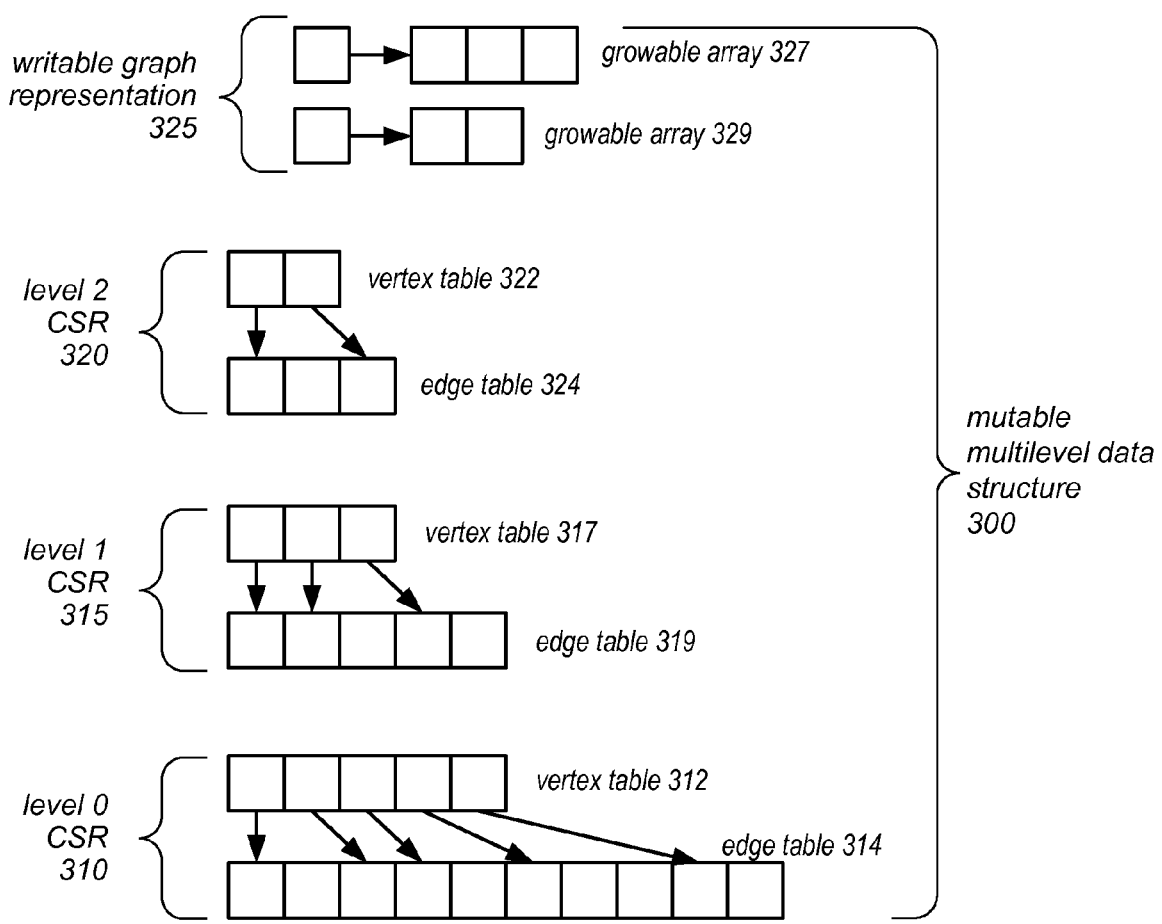
FIG. 3 is a block diagram illustrating a mutable multilevel data structure with multiple read-only levels and a single writable level, according to one embodiment.

One embodiment of a mutable multilevel data structure with multiple read-only levels and a single writable level is illustrated in FIG. 3. In this example, mutable multilevel data structure 300 includes (at level 0), a level 0 read-only CSR-like representation (shown as CSR 310), which includes vertex table 312 and edge table 314. Similarly, level 1 includes a level 1 read-only CSR-like representation (shown as CSR 315), which includes vertex table 317 and edge table 319, and level 2 includes a level 2 read-only CSR-like representation (shown as CSR 320), which includes vertex table 322 and edge table 324.

In this example, the highest level of mutable multilevel data structure 300 (level 3) is the single writeable level of the mutable multilevel data structure. This level includes a writable graph representation 325, in which adjacency lists for each vertex are stored in separate growable array. For example, two such growable arrays (growable arrays 327 and 329) are illustrated in FIG. 3, along with the corresponding indirection array elements that include pointers to those arrays. The structure and operations associated with the single writable level of the mutable multilevel data structure are described in more detail below, according to various embodiments.

Figure 4:
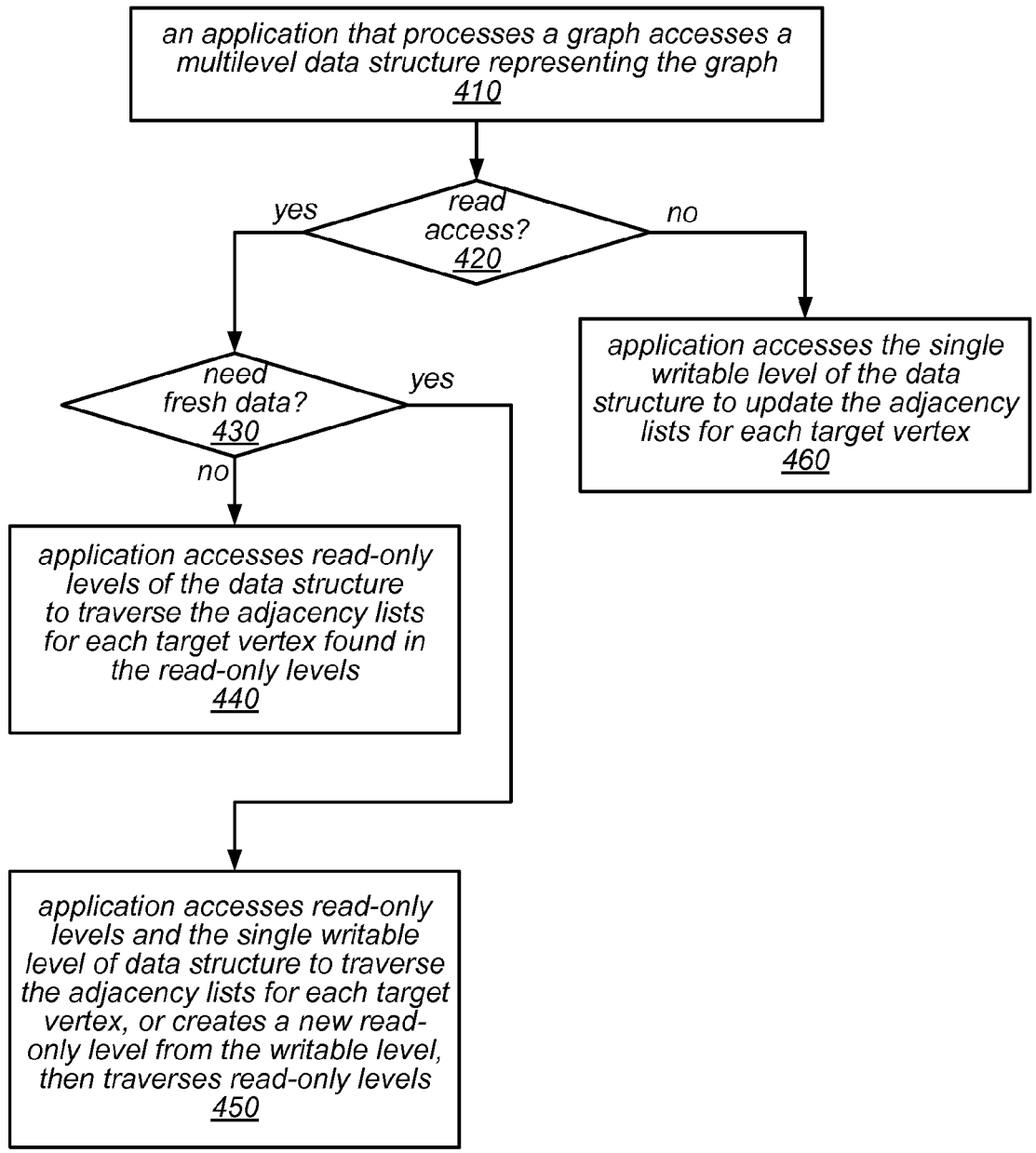
FIG. 4 is a flow diagram illustrating one embodiment of a method for accessing a mutable multilevel data structure that represents a graph for reading or writing.

One embodiment of a method for accessing a mutable multilevel data structure that represents a graph for reading or writing is illustrated by the flow diagram in FIG. 4. As illustrated at 410, in this example, the method may include an application that processes a graph accessing a multilevel data structure that represents the graph (e.g., a mutable multilevel data structure that includes one or more read-only levels and a single writable level). If the access is a read access (shown as the positive exit from 420) and the application does not need to access fresh data (i.e., completely up-to-date data), shown as the negative exit from 430, the method may include the application accessing one or more read-only levels of the mutable multilevel data structure to traverse the adjacency lists for each target vertex that is found in the read-only levels (as in 440).

However, if the access is a read access (shown as the positive exit from 420) and the application does need fresh data (e.g., if the application relies on having up-to-date information, shown as the positive exit from 430), the method may include the application accessing one or more read-only levels of the mutable multilevel data structure and the single writable level of the mutable multilevel data structure to traverse the adjacency lists for each target vertex, or the application creating a new read-only level from the single writable level of the mutable multilevel data structure (as in 450) and traversing that new read-only level along with one or more other read-only levels of the mutable multilevel data structure to traverse the adjacency lists for each target vertex.

As illustrated in this example, if the access is not a read access (e.g., if the access is a write access), shown as the negative exit from 420, the method may include the application accessing the single writable level of the mutable multilevel data structure to update the adjacency lists for each target vertex (as in 460).

In some embodiments, each read-only level of one of the mutable multilevel data structures described herein may include its own edge table array. In such embodiments, instead of each of the edge identifiers being an index into an edge table (as in a typical CSR representation), they may be a tuple consisting of a level number (indicating the level at which the appropriate edge table is located) and an index into the edge table at that level. As an optimization, in some embodiments, both elements of the tuple may be stored in a single 64-bit word. This may result in a side benefit in that the words representing edge identifiers for level 0 may be numerically equal to indices into the edge table at that level, which may allow the optimization of graph processing algorithms that run exclusively on level 0. Note that in some embodiments, running algorithms directly on level 0 may be as fast as running them on a traditional (read-only) CSR representation. Note also that, in some embodiments, the representation at level 0 may be fully self-contained, i.e., its edge table may contain the adjacency lists of all vertexes (nodes) as of time $T_0$ in their entirety. However, there may be multiple options for representing the edge tables in the higher levels. For example, three different approaches (from among many possible approaches) are described below: a performance-optimized design, a space-optimized design, and a hybrid design.

While each level of the mutable multilevel data structures described herein may include a vertex table, it would be both expensive and space inefficient to copy the entire vertex table to each level. Instead, a software copy-on-write approach may be used to create vertex tables at each level, in some embodiments. Abstractly, the vertex table at level i may contain entries for each vertex whose properties or edges were modified between the time level (i−1) was created and the time level i was created. The remaining entries may be references into vertex tables at previous levels. Taken together, the vertex tables of all levels in a mutable multilevel data structure (or all read-only levels of the mutable multilevel data structure) may collectively represent an instance of a multi-versioned array. An example implementation of the vertex table is described in more detail later. Note that, in some cases, it may be useful to be able to quickly identify which edges were newly added when a given level was created. Thus, in some embodiments, these newly added edges may (optionally) be stored at the front of the adjacency list, and the length of this list may be stored as a field in the vertex table.

As noted above, there may be several different variants of the mutable multilevel data structures described herein, and each may be particularly well-suited for a different type of workload or for systems with different resource constraints and/or resource usage policies. One of these variants is referred to herein as the "performance-optimized" variant. In this representation, the mutable multilevel data structure may include a main (or level 0) CSR-like data structure on which some graph processing computations will run exclusively. In order to deal with updates to the graph structure, the representation may include a delta map that accumulates all the incoming updates. At some point during operation (e.g., occasionally or periodically), the delta map may be frozen and a new CSR-like data structure may be created at another (e.g., a new) read-only level of the mutable multilevel data structure from the information in the frozen delta map. As with the level 0 CSR-like data structure, the new CSR-like data structure may contain a vertex table (array) and an edge table (array). These tables may reflect the updates that have been made to the graph structure since the last read-only CSR-like data structure was created on the most recently created (previous) read-only level (e.g., level 0). In some embodiments, the affected data pages of the vertex table may be copied to the new level (e.g., using a copy-on-write approach), as described in more detail below. Note that in this representation, information about a given vertex may appear in the tables at multiple levels. For example, if in level 1 a new edge is added to a particular vertex that existed in level 0, information about that vertex may appear both in level 0 and in level 1.

Figure 5:
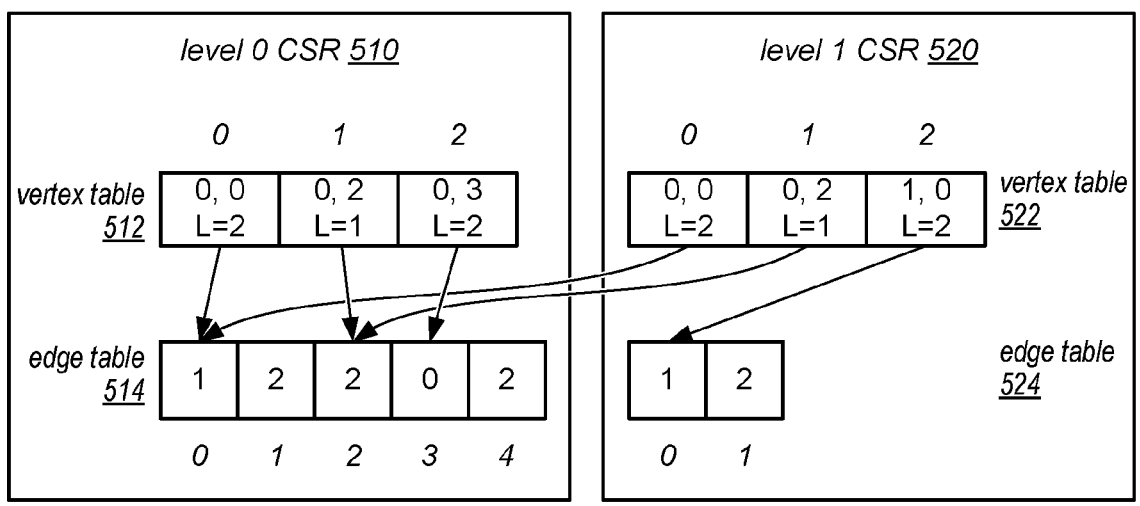
FIG. 5 is a block diagram illustrating a two-level representation of a graph structure in a performance-optimized version of a mutable multilevel data structure that also includes a single writable level, according to one embodiment.

FIG. 5 depicts a two-level representation of the graph in FIG. 2A, according to at least some embodiments. In this representation (which may correspond to two read-only levels of a performance-optimized version of a mutable multilevel data structure that also includes a single writable level, which is not shown), the level 0 CSR representation 510 (which includes vertex table 512 and edge table 514) represents the initial graph illustrated in FIG. 1A (e.g., the graph at some time $T_0$), and the level 1 CSR representation 520 (which includes vertex table 522 and edge table 524) represents the modified graph illustrated in FIG. 2A (e.g., the graph at some later time $T_1$). As noted above, in this representation, each read-only level has its own edge table array, and each of the edge identifiers stored in the vertex table is a tuple consisting of the level number at which the adjacency list can be found and an index into the edge table at that level. For example, the first element in vertex table 512 includes the tuple (0,0), indicating that the adjacency list for vertex 0 can be found in the edge table of level 0 (edge table 514) beginning at element 0 (the first element). Similarly, the second element in vertex table 512 includes the tuple (0,2), indicating that the adjacency list for vertex 1 can be found in the edge table of level 0 (edge table 514) beginning at element 2 (the third element), and the third element in vertex table 512 includes the tuple (0,3), indicating that the adjacency list for vertex 2 can be found in the edge table of level 0 (edge table 514) beginning at element 3 (the fourth element).

Note also that in this example, the adjacency list lengths for each vertex are explicitly stored in the corresponding elements of vertex tables 512 and 522. As noted above, the only changes made in the graph between time $T_0$ and time $T_1$ were the addition of an edge from vertex 2 and the removal of another edge from the same vertex. These changes are reflected in the differences between the level 0 CSR representation 510 and the level 1 representation CSR 520. More specifically, only one modified vertex is contained in the vertex table 522 for level 1 (when compared to vertex table 512 for level 0).

In this example (since the adjacency lists for the vertices 0 and 1 in the graph did not change), the first two entries in the level 1 vertex table 522 (those corresponding to vertices 0 and 1 of the graph) include the tuples (0,0) and (0,2), respectively, which reference corresponding entries (and adjacency lists) in edge table 514 in level 0 CSR 510. However, the last entry in the level 1 vertex table 522 (which corresponds to vertex 2 of the graph) includes the tuple (1,0), which references element 0 (the first element) of the edge table in level 1 (edge table 524). Here, edge table 524 has been populated with the new adjacency list for vertex 2 (in elements 0 and 1). As shown in these elements of the level 1 edge table 524 in FIG. 5, the adjacency list for vertex 2 has values of 1 and 2, which represent the edges from vertex 2 to vertex 1 and from vertex 2 to vertex 2, respectively. Note that, in this example, the entries in edge table 514 of the level 0 CSR representation 510 remain unchanged from those shown in edge table 220 FIG. 2B. In this example, the level 1 vertex table 522 was created using (software) copy-on-write, so it takes up minimal space and requires little time to create. One such software copy-on-write implementation is described below. Again note that FIG. 5 illustrates the vertex tables and edge tables of two read-only levels of a mutable multilevel data structure that also includes a single writable level, which is not shown. For example, in some embodiments, the single writable level of the mutable multilevel data structure representing the graph structure illustrated in FIG. 2A may include a delta map that is created using (software) copy-on-write.

As previously noted, in some existing systems, a standard CSR representation of a graph may be used in conjunction with a delta map, such that two versions of the graph are maintained (e.g., versions corresponding to times $T_0$ and $T_{now}$, respectively). This two-level design is (in some ways) similar to a special case of the multilevel designs described herein in which the mutable multilevel data structure includes only a single read-only level (e.g., a level 0 CSR representation) and a single writable level. The performance of the mutable multilevel data structures described herein (which may include multiple read-only levels and which may support copy-on-write enabled vertex tables) may be comparable to (or only slightly worse than) those existing data structures.

Unlike the existing log-based CSR representations described earlier (which keep all adjacency lists together in a single edge table and grows it using a memory reallocation function, such as realloc), the space-optimized version of the mutable multilevel data structures described herein may split the adjacency lists over multiple edge tables that are implemented as arrays. With modern operating systems, which typically implement efficient memory reallocating by manipulating page tables, either approach may result in efficient allocation. Embodiments in which the CSR representation is split into multiple arrays may include a very small indirection table (e.g., one that fits entirely in the cache), resulting in a minimal overhead.

As noted above, the performance-optimized version of the mutable multilevel data structures described herein may in some embodiments include log-based data structures in which updates to the edge tables are added at the end of the edge tables. For example, when an edge set (i.e., an adjacency list) for a given vertex is modified, the portion of the edge table corresponding to the given vertex (its current edge set) may be copied to the end of the edge set, and the modifications may be applied to the copied version of the edge set (which may be subsequently referenced in a new read-only level of the mutable multilevel data structure). In such embodiments, because the previous version of the edge set still exists in the edge table (at a previous level), different computations may be running concurrently on the two different versions of the edge set (on different levels of the mutable multilevel data structure). In other words, computations may run concurrently on different levels of the mutable multilevel data structure and/or may use different levels of the mutable multilevel data structure as the starting point for the computation.

In one example, a computation that begins executing after modifications have been made to a version of the edge set that was copied from level 1 to a new level 2 may access the adjacency list for the given vertex (and any other vertices whose most recent modifications are reflected at the new level) beginning with the edge table at the new level (level 2). Therefore, this computation will process fresher graph data than a computation that began running at a previous level (e.g., level 0 or level 1). In this example, the computation (or a function, operation, or method of a graph processing module that is called by the computation) may traverse one or more other (lower) levels of the mutable multilevel data structure in order to reconstruct the adjacency lists for all of the target vertices. For example, if the adjacency list for a particular vertex does not appear in level 2, the computation will go to level 1 (and, if necessary, to level 0) in an attempt to locate the adjacency list. However, if the adjacency list for a particular vertex appears in level 2, the computation will obtain the entire adjacency list that that vertex at level 2 and will not need to go to level 1 or level 0 in order to reconstruct the adjacency list. The fact that, with the mutable multilevel data structures described herein, the contents of the current writable representation (at the single writable level of the mutable multilevel data structure) can effectively be frozen by creating another read-only level (rather than having to rebuild an entire CSR representation that includes only a single read-only level) may provide performance and/or space benefits when compared to the existing log-based CSR representations described earlier. For example, while running a graph processing computation over a representation that includes a traditional CSR augmented with delta map is slow, running a graph processing computation over a copy-on-write level may be almost as fast as running the computation on a level 0 CSR representation.

As previously noted, in some embodiments, a graph analytics or graph processing application may include, or make calls to, various functions, operations, or methods of a graph processing module in order to reconstruct an adjacency list for a given vertex of a graph structure that is represented by one of the of the mutable multilevel data structures described herein, to create a new read-only level in such a structure, to merge two read-only levels of such a structure, and/or to perform other operations that target the mutable multilevel data structure. In some embodiments, the graph processing module may be a component of the operating system of the computer system on which the mutable multilevel data structure is maintained and/or on which the graph analytics or graph processing application is executing, or may be a component of a shared library on the computer system. In some embodiments, the graph processing module may perform these and/or other operations in response to the computer system receiving requests to perform computations on a graph structure that is represented by one of the of the mutable multilevel data structures described herein, where the request includes an explicit or implicit request to perform the operations implemented by the graph processing module. For example, in some embodiments, in response to a request to reconstruct an adjacency list for a given vertex, the graph processing module may perform an operation to create a new read-only level in addition to performing an operation to reconstruct the requested adjacency list. In another example, the operating system may invoke a function of the graph processing module in order to merge two read-only levels as part of a compaction operation that is performed periodically or in response to meeting certain compaction criteria.

Figure 6:
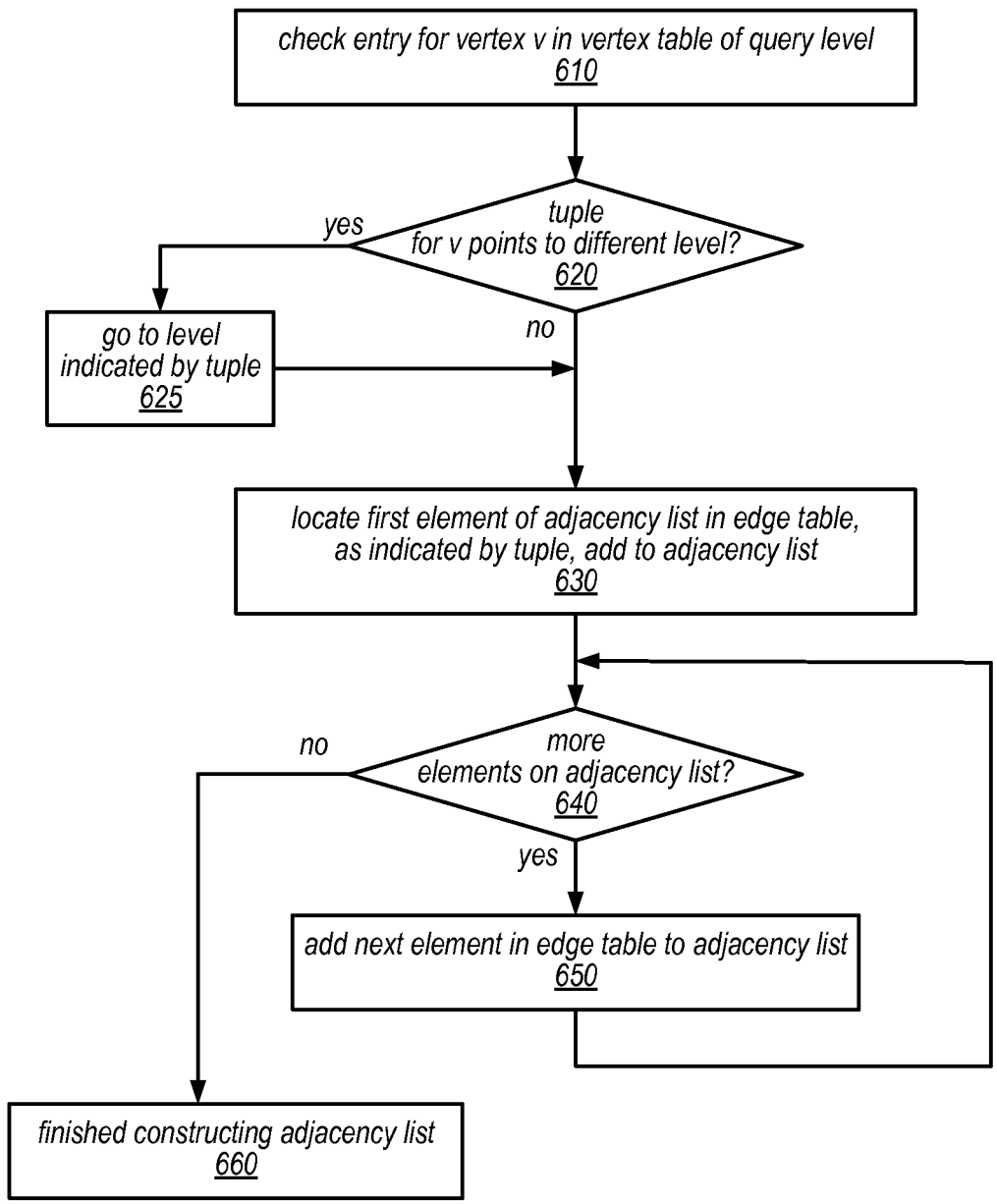
FIG. 6 is a flow diagram illustrating one embodiment of a method for reconstructing an adjacency list for a given vertex in a graph structure from a performance optimized mutable multilevel data structure that represents the graph structure.

One embodiment of a method for reconstructing an adjacency list for a given vertex v in a graph structure from a performance-optimized mutable multilevel data structure that represents the graph structure is illustrated by the flow diagram in FIG. 6. As illustrated at 610, in this example, the method may include checking an entry for vertex v in the vertex table of a particular query level in the mutable multilevel data structure (e.g., a level implicitly or explicitly specified in a computation, query request, or other operation that triggered the reconstruction of the adjacency list for vertex v, such as a function, operation, or method of a graph processing module that is called by a graph analytics computation) may traverse one or more other (lower) levels of the mutable multilevel data structure in order to reconstruct the adjacency lists for all of the target vertices. If the information in the tuple stored in the vertex table at the query level for vertex v indicates that the latest edge information for vertex v is not found at the query level (i.e., if the tuple points to a different level, shown as the positive exit from 620), the method may include going to the level at which the latest information is found, as indicated by the information stored in the tuple (as in 625).

If, on the other hand, the information stored in the tuple in the vertex table at the query level for vertex v indicates that the latest edge information for vertex v is found at the query level (shown as the negative exit from 620), or after going to the level at which the latest information is found (as in 625), the method may include locating the first element of the adjacency list for vertex v in the edge table, as indicated by information stored in the tuple, and adding it to the adjacency list for vertex v, as in 630.

As illustrated in this example, while there are more elements on the adjacency list for vertex v at the currently accessed level (shown as the positive exit from 640), the method may include adding the next element in the edge table to the adjacency list for vertex v (as in 650). Once there are no more elements on adjacency list, the construction of the adjacency list for vertex v may be complete. This is illustrated in FIG. 6 by the feedback from 650 to 640 and the path from the negative exit of 640 to 660.

Creating a New Read-Only Level

As noted above, in some embodiments, a new read-only level (e.g., an additional CSR-like representation) may be created in a mutable multilevel data structure that represents a graph structure from the information found at the single writable level of the mutable multilevel data structure. The creation of a new read-only level may be triggered by different conditions and criteria, in different embodiments. For example, in some embodiments, a new read-only level may be created periodically (e.g., using a hard timer) such that modifications are collected (and reflected) at the single writable level of the mutable multilevel data structure for a pre-determined (fixed or configurable) period of time (e.g., for one hour), after which a new immutable version of the data structure (e.g., a new read-only level of the mutable multilevel data structure) may be created from the single writable level (which may implement a delta map or another suitable representation of the changes to the graph structure). In other embodiments, the creation of a new read-only level may be dependent on the number of modifications that have been made to the graph structure since the last time a read-only level was created. For example, in embodiments in which the single writable level is implemented using a delta map, the creation of a new read-only level may be dependent on the size of the delta map. In such embodiments, once the delta map meets or exceeds a pre-determined (fixed or configurable) size, this may trigger the creation of a new read-only CSR-like level in the mutable multilevel data structure. In still other embodiments, the creation of a new read-only level may be triggered by an explicit call within a graph analytics computation or graph processing application to a function, operation, or method of a graph processing module that is configured to create the new read-only level.

In some embodiments, a new read-only level may be created in a mutable multilevel data structure such as those described herein when fresher data is needed for a particular graph processing computation or in order to speed up the execution of a graph processing computation. For example, a system that implements and/or employs the mutable multilevel data structures described herein to represent graph structures when performing graph analytics or other graph processing computations may provide and support the use of an explicit command to create a new read-only level. In some embodiments, such a command may be invoked by an administrator or from an operating system process (e.g., in response to a timeout condition or once a delta map on the writable level meets or exceeds a pre-determined size). In some embodiments, such systems may provide an API through which a graph processing application may request the creation of a new read-only level in a mutable multilevel data structure (e.g., a graph processing application may include a call to an operation of a graph processing module to create a new read-only level prior to running a computation). In some embodiments, a command to merge two read-only levels may be invoked by an administrator or operating system process, or through an API call in a graph processing application, in order to compact the mutable multilevel data structure (e.g., a graph processing application may include a call to an operation of a graph processing module to merge two or all read-only levels prior to running a structure-intensive computation).

Figure 7:
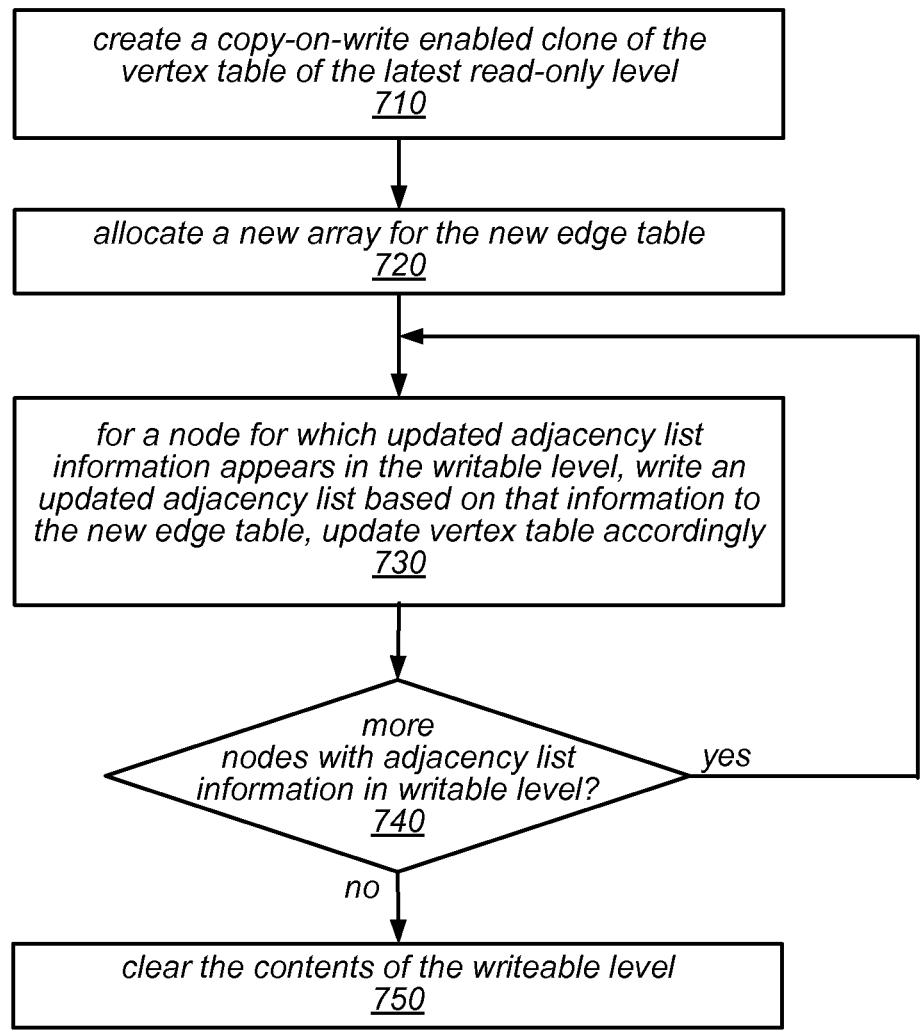
FIG. 7 is a flow diagram illustrating one embodiment of a method for creating a new read-only level in a mutable multilevel data structure that represents a graph structure and that includes multiple read-only levels and a single writable level.

One embodiment of a method for creating a new read-only level in a mutable multilevel data structure that represents a graph structure and that includes multiple read-only levels and a single writable level is illustrated by the flow diagram in FIG. 7. As illustrated at 710, in this example, the method may include creating a copy-on-write enabled clone of the vertex table of the latest read-only level (e.g., the most recently created read-only data structure in the mutable multilevel data structure, which in most cases will be the level immediately preceding the single writable level in the mutable multilevel data structure). The method may also include allocating a new array for the edge table of the new read-only level (as in 720). Once the new array has been allocated, the method may include, for a node (vertex) in the graph structure for which updated adjacency list information appears in the single writable level of the mutable multilevel data structure, writing an updated adjacency list based on information found at the single writable level of the mutable multilevel data structure to the new edge table and updating the vertex table accordingly, as in 730.

As illustrated in this example, while there are more nodes (vertices) for which updated adjacency list information exists in the single writable level of the mutable multilevel data structure (shown as the positive exit from 740), the method may include repeating the operation illustrated at 730 for each of those nodes (vertices). Once there are no additional nodes (vertices) for which updated adjacency list information exists in the single writable level of the mutable multilevel data structure (shown as the negative exit from 740), the method may include clearing the contents of the single writable level of the mutable multilevel data structure, as in 750.

Note that, in some embodiments, an operation to create a new read-only level (such as that illustrated in FIG. 7 and described above) may execute concurrently with graph analytics or other graph processing computations that are running on any of the previous read-only levels. In some embodiments, concurrent updates to the mutable multilevel data structures described herein (e.g., write operations targeting the single writable level of these mutable multilevel data structures) may be allowed during the creation of a new read-only level, while in other embodiments, such concurrent writes may not be allowed during the creation of a new read-only level.

The use of the mutable multilevel data structures described herein may allow graph processing applications to traverse the edge sets (the adjacency lists) of the vertices of a graph structure in one direction, which may be sufficient for many graph processing applications. However, some graph processing algorithms may require the ability to traverse the edge sets (the adjacency lists) of the vertices in both directions. In some embodiments, such applications may be supported by optionally maintaining another instance of the mutable multilevel data structures described herein that stores the adjacency lists for incoming, rather than outgoing, edges. As described above, a representation of the incoming edges may include a compressed sparse column representation at each of the read-only levels of the additional instance of these mutable multilevel data structures rather than a compressed sparse row (CSR) representation.

In some embodiments, vertex (node) properties may be stored in separate copy-on-write tables that map vertex identifiers to property values. In various embodiments, different approaches may be taken for storing edge properties including, but not limited to, the following two options:

1. The property values may be stored in flat arrays, one for each level, parallel to the corresponding edge table. With this approach, in order to preserve the multi-version nature of the data, modifying a property value in an older level may be implemented by recreating the edge in the new read-only level with the new property value. In some cases, this may result in duplicating the entire adjacency list.
2. The property values may be stored in copy-on-write arrays, one for each level.

In some systems and/or use cases, property updates may be expected to be more frequent than structural updates. In such embodiments, the option 2 above may be a more suitable approach, trading potentially significant space savings for a negligible performance hit for read operations.

As previously noted, the CSR representation at each read-only level of the mutable multilevel data structures described herein may define an edge identifier as an index into the edge table or, in some cases, a tuple consisting of a level number and an index value. Thus, the identifier of an outgoing edge is different from the identifier of the corresponding reverse edge, and translation between the two types of identifiers may be needed in order to be able to properly handle edge properties and edge deletion. In some embodiments, the system may maintain a mapping between source and destination nodes for an edge using edge properties. For example, for an edge whose edge ID for the outgoing edge is p and whose edge ID for the incoming edge is q, a property may be associated with p whose value is q and a property may be associated with q whose value is p.

Some graph processing algorithms can benefit greatly by being able to ascertain the identity of the source vertex for an edge, given an edge ID. To support such applications, some embodiments may optionally create one flat array per level (indexed by edge ID) in which each indexed element contains the corresponding source vertex ID. In other embodiments, this information may be stored as another edge property using copy-on-write arrays. However, because the edge source is fixed and does not change throughout the lifetime of the edge, the use of copy-on-write arrays may not be warranted.

Merging Read-Only Levels

As noted above, a working system that employs the mutable multilevel data structures described herein may have the ability to merge read-only levels (e.g., to create a new read-only level that takes the place of the two merged levels) in order to consolidate space. For example, in some embodiments, two consecutive read-only levels may be merged as follows:

1. Iterate over the two edge tables to produce a merged edge table containing one adjacency list for each vertex that has edges in either level. If a vertex has an adjacency list in both levels, select the list in the higher (more recent) read-only level. Merge the vertex table by creating a copy-on-write version of the vertex table from the higher level and update it accordingly.
2. While merging, compute a merge-translation map, $M_{out}$, that stores, for each affected edge, a mapping from the edge ID in the edge's original level to the edge ID in the new read-only level.
3. Merge the out-edge sources in parallel using $M_{out}$ (if applicable).
4. Merge the in-edges to produce a merge-translation map, $M_{in}$.

5. Merge the map of out-to-in edges using $M_{out}$, translating the values using $M_{in}$ (note that the edge IDs change during the merge process).
6. Merge the map of in-to-out edges using $M_{in}$, translating the values using $M_{out}$.
7. Finally, merge the vertex (node) and edge properties from the two read-only levels to produce a set of merged vertex (node) and edge properties at the new read-only level.

Note that, in some situations (e.g., for a computation for which it would be expensive to work through all of the read-only levels of the mutable multilevel data structures described herein), all of the read-only levels of a mutable multilevel data structure may be merged together to build a new level 0 read-only data structure. For example, the technique described above may be performed recursively to two levels at a time to build a new level 0 read-only data structure that serves as a consistent snapshot of the entire graph structure. While building the new level 0 read-only data structure may be expensive, once it has been created, the computation may be run on that single level with very good performance. In another example, all of the read-only levels of a mutable multilevel data structure may be merged together to build a new level 0 read-only data structure without performing pairwise merging, as follows:
1. Create the new vertex table: Get an array of vertex degrees and compute the cumulative sum; this provides the index into the edge table for each vertex.
2. For each property, create the merged property table as follows: Iterate over the vertices and write only the most recent property value into the new merged table.
3. Construct the new edge table and edge property tables as follows: For each vertex, read the entire adjacency list and the corresponding properties, and write them out into the new edge table and the edge property tables.

Space-Optimized Design

As noted above, there may be several different variants of the mutable multilevel data structures described herein, and each may be particularly well-suited for a different type of workload or for systems with different resource constraints or resource usage policies. A performance-optimized variant is described above. While the performance-optimized design may exhibit good performance for a variety of workloads, the memory overhead can grow quickly if the graph structure it represents changes often and new read-only levels are created (resulting in more duplication of edges as new copies of various adjacency lists are created). However, this may be mitigated with frequent merging of read-only levels. Another variant of the mutable multilevel data structures described herein may be referred to herein as the "space-optimized" variant. In some embodiments, the space-optimized design trades a small performance penalty for low memory overhead for a large class of graph algorithms. In this representation, merging of read-only levels becomes less necessary, to the point of being unnecessary in many scenarios.

In some embodiments, instead of replicating the entire outgoing edge list of a vertex whose edge set is changing (as in the performance-optimized variant described above), the space-optimized variant of the mutable multilevel data structures described herein may add only any new outgoing edges of the vertex to an edge set for that vertex in the new level. For example, in some embodiments, of the space-optimized variant, the read-only CSR-like representation of a graph structure at level 0 may (as in the performance-optimized variant) contain full adjacency lists of all nodes as of a given time $T_0$. However, in the space-optimized variant, the edge tables of the read-only CSR-like representations at higher read-only levels may store only newly added edges, rather than complete adjacency lists. This approach may save space (when compared to the performance-optimized variant) but may require that multiple levels of a mutable multilevel data structure be examined in order to reconstruct the adjacency list for a given node.

In some embodiments, the vertex table of the space-optimized variant may be similar, but not identical to, the vertex table in the performance-optimized variant. For example, in some embodiments, a pre-computed node degree may be added to each element in the vertex table, which may speed up certain graph processing algorithms (e.g., page ranking algorithms) that need this value and might otherwise have to count edges in multiple levels. Although the size of the vertex table may be increased by including the node degree, the vertex table at a given level may no longer have to identify which edges of a vertex are new at the current level, because the current level stores only those edges that are new.

In some embodiments of the space-optimized variant, a deletion vector may be added at each level that stores (in a respective entry for each edge) an indication that the edge was deleted (if it has been deleted) or a NIL value (if it still exists). In some embodiments of the space-optimized variant, the deletion vector may store (in the respective entry for each edge) the number of the level in which the edge was deleted (if it has been deleted) or a NIL value (if it still exists). In other words, logical timestamps (e.g., level numbers or another type of timestamp) may be used to mark the deletion of an edge, rather than a single deleted bit, which may facilitate multi-version access. In some embodiments, there may be single a deletion vector element (e.g., a deletion bit, level number, or timestamp) for each edge, which is found in the deletion vector at level at which the edge was introduced. For example, the deletion vector elements for all the edges that were introduced into the mutable multilevel data structure representation at level 0 are found at level 0, the deletion vector elements for any new edges that were introduced into the mutable multilevel data structure representation in level 1 are found at level 1, and so on. In such embodiments, in order to determine whether a particular edge has been deleted, the examination of the deletion vectors may just have to traverse the levels of the mutable multilevel data structure representation as far back as the level at which it was added (i.e., to find the corresponding deletion vector element). Note, however, that because deletion vectors incur a small but non-negligible overhead, and because there are many applications that do not require or support edge deletions, such deletion vectors may be optional in the space-optimized variant of the mutable multilevel data structures described herein. In some embodiments, the deletion vector may be embedded in the edge table. For example, the elements in the edge table may be 64 bits long, where no more than k bits are needed to represent a level number, and no more than (64−k) bits are needed to represent a vertex ID. In such embodiments, the deletion vector elements may be stored in the highest k bits of the corresponding elements. In this way, the deletion vector may not require any additional space. For example, in one such embodiment, k=16. In still other embodiments, deletions may be represented in the mutable multilevel data structures using tombstones, but the resulting performance may be significantly lower than in implementations that employ deletion vectors.

Figure 8:
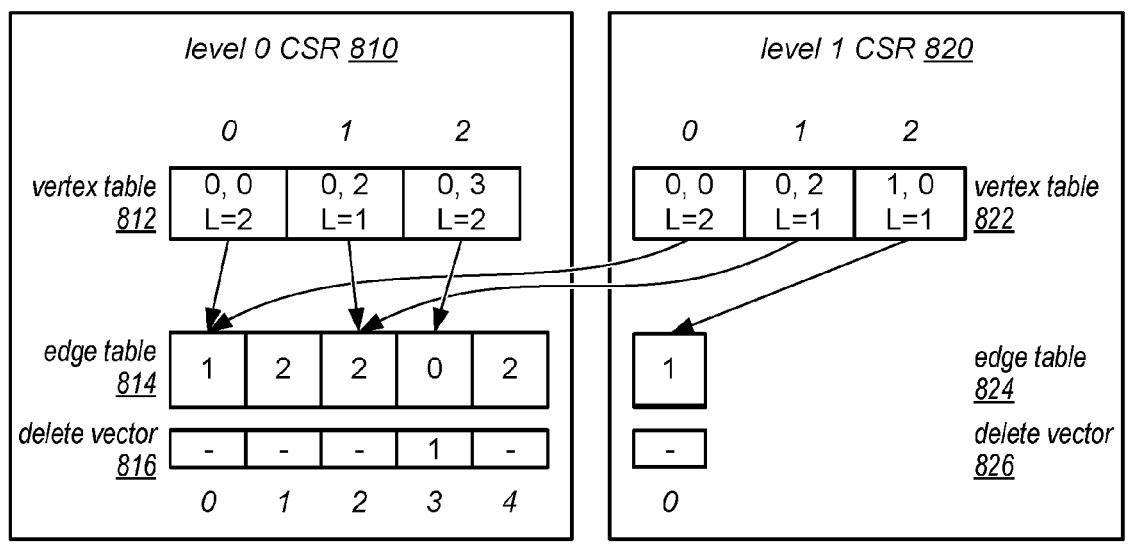
FIG. 8 is a block diagram illustrating a two-level representation of a graph in a space-optimized version of a mutable multilevel data structure that also includes a single writable level, according to one embodiment.

FIG. 8 depicts a two-level representation of the graph in FIG. 2A, according to at least some embodiments. In this representation (which may correspond to two read-only levels of a space-optimized version of a mutable multilevel data structure that also includes a single writable level, which is not shown), the level 0 CSR representation 810 (which includes vertex table 812, edge table 814, and delete vector 816) represents the initial graph illustrated in FIG. 1A (e.g., the graph at some time $T_0$), and the level 1 CSR representation 820 (which includes vertex table 822, edge table 824, and delete vector 826) represents the modified graph illustrated in FIG. 2A (e.g., the graph at some later time $T_1$). As in the previous example, the adjacency list lengths for each vertex are explicitly stored in the corresponding elements of vertex tables 812 and 822. As noted above, the only changes made in the graph between time $T_0$ and time $T_1$ were the addition of an edge from vertex 2 and the removal of another edge from the same vertex. These changes are reflected in the differences between the level 0 CSR representation 810 and the level 1 representation CSR 820. In this representation, the deletion of the edge from vertex 2 to vertex 0 between time $T_0$ and time $T_1$ is indicated by a corresponding element in the delete vector 816 of the level 0 CSR representation 810. More specifically, the value "1" in the fourth element of the delete vector 816 indicates that the corresponding edge (i.e., the edge represented by the fourth element of edge table 814) was deleted in the level 1 CSR representation 820. In this representation, since the fifth element of the delete vector 816 (the element corresponding to the edge from vertex 2 to vertex 2) is empty (e.g., it has a NIL value), this indicates that the corresponding edge has not yet been deleted.

Note that, as in the previous example, the first two entries in the level 1 vertex table 822 (those corresponding to vertices 0 and 1 of the graph) reference the corresponding entries (and adjacency lists) in edge table 814 in level 0 CSR 810 (since the adjacency lists for the corresponding vertices 0 and 1 in the graph did not change). However, the last entry in the level 1 vertex table 822 (which corresponds to vertex 2 of the graph) references the new edge added to the representation in level 1. Here, the level 1 edge table 824 contains only a single element representing the newly added edge (i.e., the edge from vertex 2 to vertex 1). In this example, the adjacency list for vertex 2 includes a value of 2 that is obtained from the fifth element of edge table 814 in level 0 CSR representation 810, and a value of 1 that is obtained from the first (and only) element of edge table 824 in level 1 CSR representation 820. Note that, in this example, the entries in edge table 814 of the level 0 CSR representation 810 remain unchanged from those shown in edge table 220 FIG. 2B. In this example, the level 1 vertex table 822 was created using (software) copy-on-write, so it takes up minimal space and requires little time to create. One such software copy-on-write implementation is described below. Again note that FIG. 8 illustrates the vertex tables and edge tables of two read-only levels of a mutable multilevel data structure that also includes a single writable level, which is not shown. For example, in some embodiments, the single writable level of the mutable multilevel data structure representing the graph structure illustrated in FIG. 2A may include a delta map that is created using (software) copy-on-write.

In embodiments that employ the techniques described above, a complete adjacency list for a vertex v may be reconstructed as shown in the following example pseudo-code:

```
adj list ← { }
L ← query level
repeat
// Get entry corresponding to vertex v in the vertex table of level L
    E ← vertexTable[L, v]
    if E is NIL then
        break
    end if
// the adjacency list for v continues at index E.index of the edge table of
level E.level
    L ← E.level
    for i = 0...(E.length − 1) do
        k ← E.index + i
        d ← deletionVector[L, k]
        if d is NIL or d > query level then
            adj list ← adj list ∪ {edgeTable[L, k]}
        end if
    end for
    L←L−1
until L < 0
```

For the example graph structure described above (and the changes to the graph structure illustrated in FIG. 1A and FIG. 2A), in order to reconstruct the adjacency list for vertex 2 as of level 1 from the space-optimized mutable multilevel data structure illustrated in FIG. 8, level 1 is examined first. Here, it is discovered that there is one entry in edge table 824 that corresponds to vertex 2 (an element indicating an outgoing edge from vertex 2 to vertex 1) and that this element corresponds to a NIL value in the corresponding element in deletion vector 826. Therefore, this element is added to the adjacency list. In this example, level 0 is examined next. At level 0, there are two entries in edge table 814 for vertex 2. For the first entry (which indicates an outgoing edge from vertex 2 to vertex 0), the value of the corresponding element in the deletion vector is set to 1 (which is equal to the query-level). Therefore, this entry is ignored (i.e., it is not added to the adjacency list for vertex 2). For the next entry (which indicates an outgoing edge from vertex 2 to vertex 2), the value of the corresponding element in the deletion vector is NIL (meaning the corresponding edge has not been deleted). Therefore, this entry is added to the adjacency list for vertex 2. As there are no further levels in this example, the result of the reconstruction is the adjacency list {1, 2}.

Note that if a query were issued to reconstruct the adjacency list of vertex 2 as of the time of level 0, only the entries at level 0 would be examined. As noted above, at level 0, there are two entries in edge table 814 for vertex 2, and for the first entry (which indicates an outgoing edge from vertex 2 to vertex 0), the value of the corresponding element in the deletion vector is set to 1. In this example, since the query-level is 0 and the value of the corresponding element in the deletion vector for the first entry is greater than 0, this indicates that the edge from vertex 2 to vertex 0 was deleted after the query time. Therefore, this edge would be added to the adjacency list for vertex 2. For the next entry (which indicates an outgoing edge from vertex 2 to vertex 2), the value of the corresponding element in the deletion vector is NIL (meaning the corresponding edge has not been deleted). Therefore, the result of the reconstruction is the adjacency list {0, 2}.

Note that one property of this approach that is not illustrated by the examples above is that if the adjacency list of a given vertex is spread over n levels, at most n+1 levels are examined, even if the total number of levels in the mutable multilevel data structure representing the graph is much larger. In other words, because the vertex tables at levels that do not include elements of a given adjacency list may include pointers to lower levels that do contain fragments of the given adjacency list, not all of the levels in between must be examined. For example, consider a mutable multilevel data structure with 10 read-only levels in which the adjacency list fragments for a given vertex (node) are found at levels 5 and 8. Using the approach described above, the vertex table of level 10 will be examined first, and will indicate that the adjacency list starts at some index at level 8. In this case, it will not be necessary to examine level 9. After processing the portion of the adjacency list at level 8, level 7 will be examined. The information at level 7 (which does not include any elements of the adjacency list) will point to the continuation of the adjacency list at level 5. In this case, it will not be necessary to examine level 6. After processing the portion of the adjacency list at level 5, the vertex table at level 4 will be examined and the reconstruction operation will terminate because level 4 does not contain any information about the given vertex (indicating that the given vertex was added after the creation of level 4). Note that the vertex tables and/or edge tables at some levels may be very large if a large number of vertices and/or edges are added at that level.

The space-optimized variant of the mutable multilevel data structures described herein may be well suited for workloads in which there are some very busy nodes (e.g., vertices whose edge sets change often). For example, in a social media network, there may be vertices representing celebrities with lots of "edges" to their fans and followers, and there may be a lot of activity on these busy vertices. If the graph structure for this social media network were represented using the performance-optimized variant of the mutable multilevel data structures described herein, the entire edge set for these busy nodes would need to be replicated at each of the read-only levels of the data structure since, presumably, these edges would be modified in each of the levels that are created. In this example, there could be a lot of duplication of data in the mutable multilevel data structure. On the other hand, if the graph structure for this social media network were represented using the space-optimized variant of the mutable multilevel data structures described herein, only the edges that are modified at each of the levels would need to be present at those levels, rather than the entire adjacency lists for these busy nodes. Typically, these graph-related workloads create edges and vertices in a sequence. Therefore, to reconstruct the adjacency lists at a given level, the reconstruction operation would walk down the areas of the mutable multilevel data structure representing the target vertices and edge sets, and whenever a new edge is encountered, check to see if the deletion bit is set in the level. If not, that edge may be processed. However, if the deletion bit is set, that edge may be skipped and the reconstruction operation may continue on.

Figure 9A:
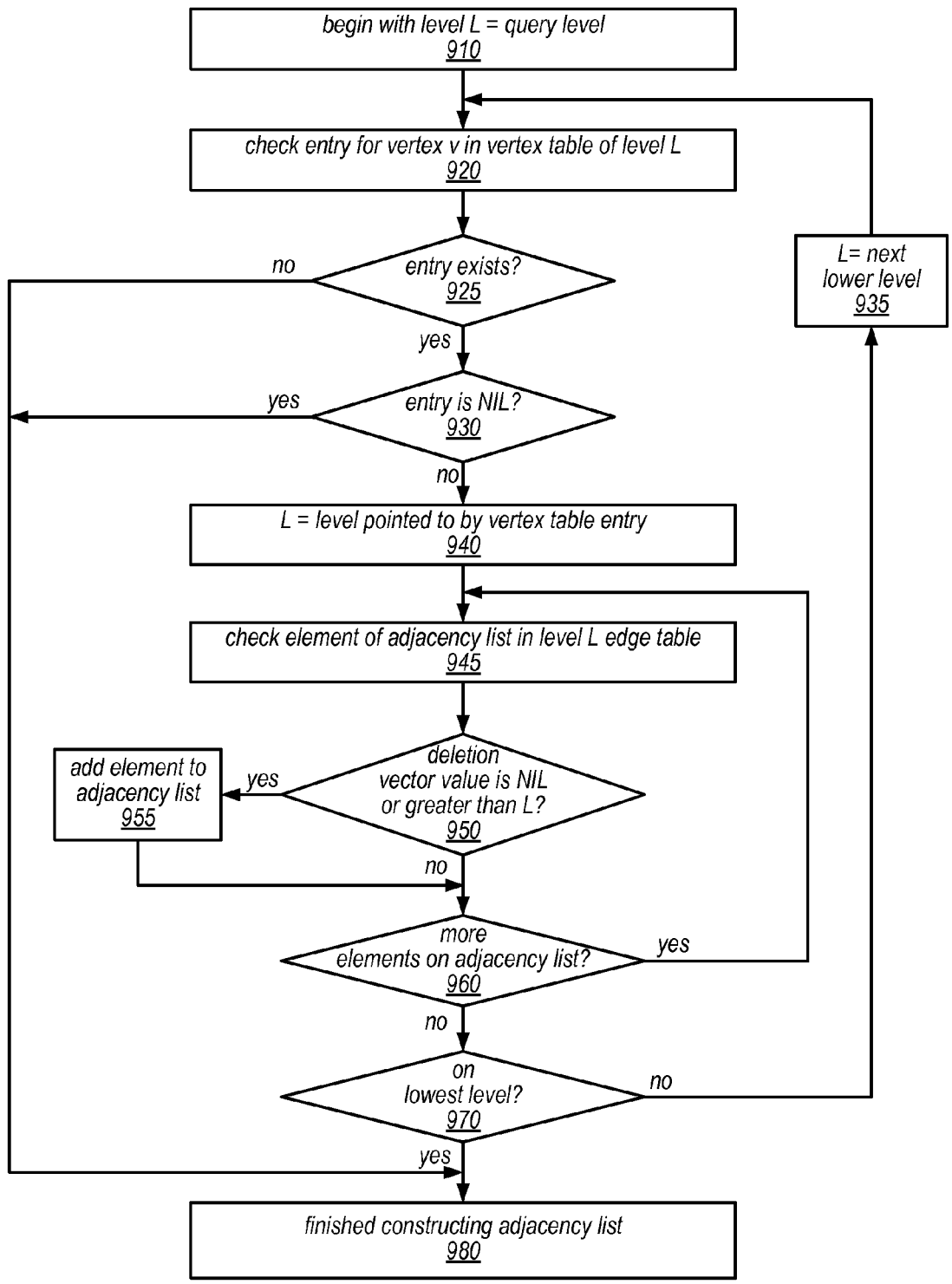
FIG. 9A is a flow diagram illustrating one embodiment of a method for reconstructing an adjacency list for a given vertex in a graph structure from a space-optimized mutable multilevel data structure that represents the graph structure.

One embodiment of a method for reconstructing an adjacency list for a given vertex v in a graph structure from a space-optimized mutable multilevel data structure that represents the graph structure is illustrated by the flow diagram in FIG. 9A. As illustrated at 910, in this example, the method may begin at a particular level L in the mutable multilevel data structure that is the query level (e.g., a level implicitly or explicitly specified in a computation, query request, or other operation that triggered the reconstruction of the adjacency list for vertex v, such as a function, operation, or method of a graph processing module that is called by a graph analytics computation). The method may include checking an entry for vertex v in the vertex table at level L in the mutable multilevel data structure, as in 920. If no such entry exists (e.g., if vertex v was created at a level higher than level L), shown as the negative exit from 925, construction of the adjacency list may be considered complete, as in 980. If the entry for vertex v exists (shown as the positive exit from 925), but it stores a value of NIL (shown as the positive exit from 930), this may indicate that the adjacency list for vertex v is empty. In this case, construction of the adjacency list may be considered complete, as in 980. Note that in some embodiments, a NIL value in an entry of the vertex table may be used to mark a deleted vertex.

If the entry does not store a value of NIL (shown as the negative exit from 930), it may point to the level currently being examined or to a lower level, and L may be set to the level at which construction of the adjacency list will continue, i.e., to the level pointed to by the vertex table entry (as in 940). The method may include checking an element of the adjacency list for vertex v in the edge table at level L (the level indicated by the vertex table entry), as in 945. If the deletion vector value for that element is NIL or is greater than L (shown as the positive exit from 950), the method may include adding the element to the adjacency list for vertex v, as in 955. Otherwise (e.g., if the deletion vector value for that element is not NIL and is not greater than L), shown as the negative exit from 950, the method may include ignoring this element (i.e., refraining from adding it to the adjacency list for vertex v).

As illustrated in this example, while there are more elements on the adjacency list for vertex v at level L (shown as the positive exit from 960), the method may include repeating the operations illustrated in FIG. 9A (as applicable) for each additional element on the adjacency list for vertex v at level L, beginning with the operation shown at element 945. Once there are no additional elements on the adjacency list for vertex v at level L (shown as the negative exit from 960), the method may include determining whether the lowest level in the mutable multilevel data structure has been examined (as in 970). If not (shown as the negative exit from 970), the method may include moving to the next lower level (e.g., decrementing L), as in 935, and repeating the operations illustrated in FIG. 9A (as applicable) beginning with the operation shown in element 920. If, or once the lowest level in the mutable multilevel data structure has been examined (shown as the positive exit from 970), construction of the adjacency list may be complete (as in 980).

In some embodiments of the space-optimized mutable multilevel data structures described herein, a "next" pointer entry may be added to the end of each adjacency list in levels other than level 0, indicating where the adjacency list continues. For example, the next pointer entry may include the level number, the index into the corresponding edge table, and the number of elements in the next fragment of the adjacency list. Note that this may also be what goes into the vertex table. In some such embodiments, the next pointer entry for the last fragment of the adjacency list may include a special NIL pointer value. Note, however, that there may be no need to include next pointers in level 0, as they would all be NIL (since all adjacency lists at level 0 must end at level 0).

Figure 9B:
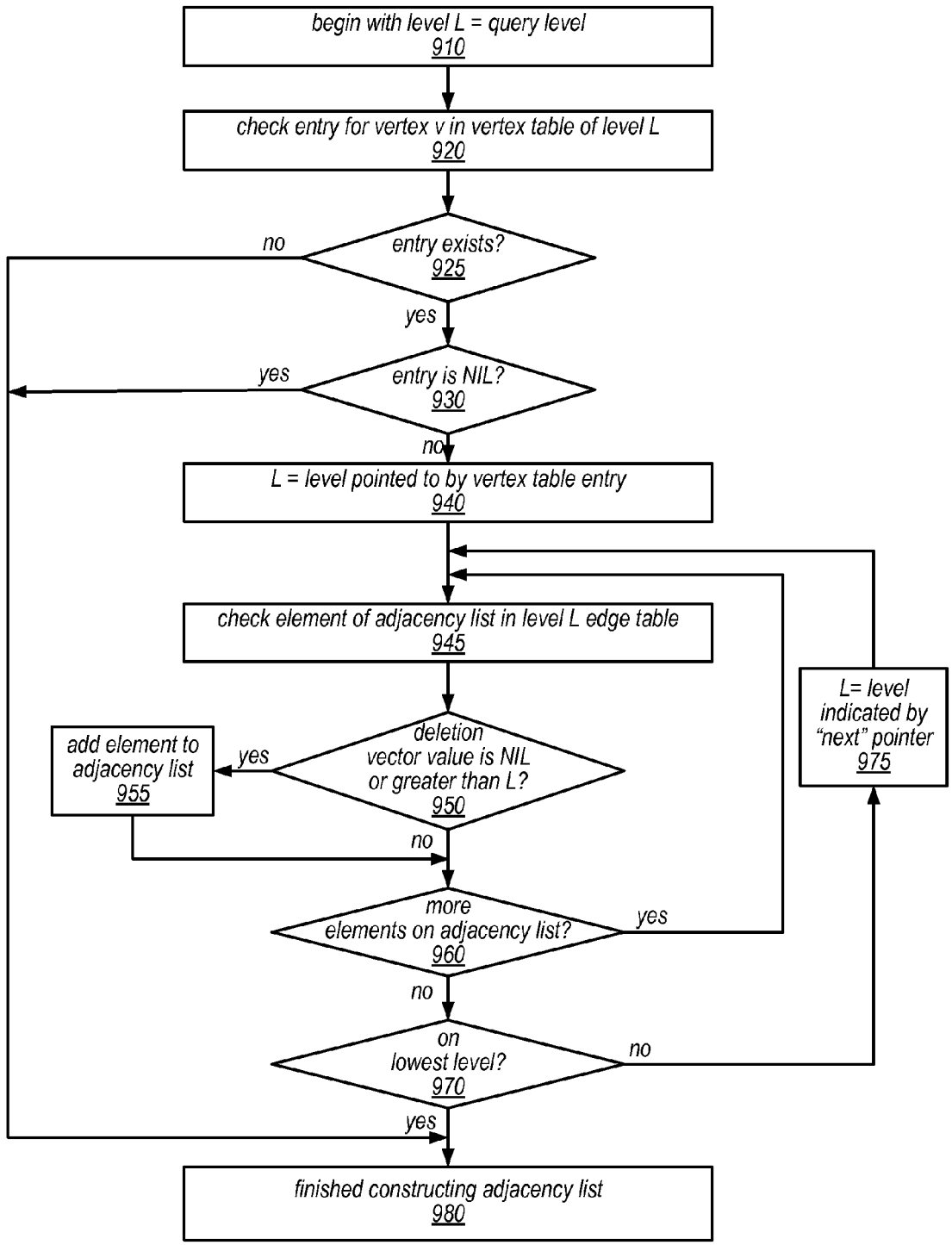
FIG. 9B is a flow diagram illustrating one embodiment of a method for reconstructing an adjacency list for a given vertex in a graph structure from a space-optimized mutable multilevel data structure that represents the graph structure and that includes next pointers.

One embodiment of a method for reconstructing an adjacency list from a space-optimized mutable multilevel data structure that includes next pointers is illustrated by the flow diagram in FIG. 9B. As illustrated in this example, the method is similar to FIG. 9A, except that construction of the adjacency list need not include the examination of some levels of the mutable multilevel data structure if there is no additional information about the adjacency list on those levels. In this example, once all of the elements on the adjacency list for vertex v at a particular level L have been added to the adjacency list (shown as the negative exit from 960), if the lowest level in the mutable multilevel data structure has not yet been examined (shown as the negative exit from 970), the method may include reading the next pointer entry to determine the level at which construction of the adjacency list should continue (and the index into the edge table at that level), as in 975, rather than returning to the vertex table to determine the level at which construction of the adjacency list should continue (as in the method illustrated in FIG. 9A). In other words, L may be set to the level at which the next fragment of the adjacency list can be found, as indicated in the next pointer, and construction of the adjacency list may continue at that level, beginning at element 945. In such embodiments, the vertex table is accessed only once, which may provide a significant performance benefit when processing graphs for which the mutable multilevel data structure representations are much larger than can fit in local (main) system memory. In some embodiments, this approach may also allow edge deletions to be implemented without the need for deletion vectors, e.g., by rewriting the entire updated adjacency list followed by the NIL pointer (which may be similar to the approach taken under the copy-on-delete policy described below).

Parameterized Design

As described in detail above, a mutable multilevel data structure representation of a graph structure may be optimized for performance or for space, in different embodiments. In still other embodiments, a hybrid representation may work well in both dimensions. This hybrid design (e.g., a variant that is parameterized to capture a wide variety of points on the spectrum between the extremes of the space-optimized designs and the performance-oriented designs) may, in some embodiments, improve the performance of algorithms that do not work particularly well in the space-optimized design and may incur lower space overhead than the performance-oriented design. For example, the performance-optimized variant always creates a copy of the adjacency lists and always writes out the new adjacency lists at each new read-only level, and the space-optimized variant never creates a copy of the adjacency list, but only stores the changes at each new read-only level. In other words, the performance- and space-optimized designs occupy the two extreme points of the spectrum of "pass by copy" to "pass by reference" as applied to adjacency lists. The performance-optimized design implements adjacency lists by copying them; the space-optimized design implements adjacency lists by chaining references. In some embodiments, a hybrid design may operate at various points along that spectrum by dynamically choosing when to copy the adjacency lists and when to chain references to the adjacency lists.

Any number of approaches may be taken to implement a hybrid variant of the mutable multilevel data structures described herein, each making different tradeoffs between space and performance for different workloads, different resource constraints or resource usage policies, or based on other criteria. These approaches may include, but are not limited to, the example variants described below. In these examples, decisions about whether to create a copy of an entire adjacency list or store only the changes to an adjacency list may be based, at least in part, on the lists of the adjacency lists, although other criteria may be used in other embodiments.

More specifically, two variants may operate at the following points along the "pass by copy" to "pass by reference" spectrum:

Represent small adjacency lists by reference and represent large adjacency lists using copies.

Represent small adjacency lists using copies and represent large adjacency lists with references.

In these example variants, assuming deletions are ignored, the decision of whether to use copies or references may be based on the degree of the vertex (node), which is readily available in the vertex table. In embodiments in which it is expected that delete operations will be less frequent than other kinds of updates, a copy-on-delete policy may be implemented that always copies the adjacency list in the presence of a delete, regardless of the node degree. Note that in such embodiments, there may be no need to maintain a deletion vector. In some embodiments, one additional bit may be added to these hybrid representations per vertex. This additional bit may indicate whether the vertex's adjacency list is complete (i.e., that it was copied) or whether it is a by-reference list and is composed by traversing multiple levels of the hybrid mutable multilevel data structure representation. In such embodiments, when reconstructing an adjacency list for a given vertex, this additional bit may indicate the manner in which the adjacency list is to be reconstructed for that vertex (e.g., in a manner similar to that described above for a performance-based variant, if the entire adjacency list was written to the new read-only level, or in a manner similar to that described above for a space-optimized variant, if only the changes were written to the new read-only level).

In yet another embodiment, a hybrid variant of the mutable multilevel data structures may be implemented such that both of the variants described above are supported. In such embodiments, the representation may be parameterized by two values: a degree cutoff and a bit that indicates whether a "copy-large" policy or a "copy-small" policy is in effect. In one such embodiment, a new read-only level may be created as illustrated in the following example pseudo-code:

```
for all Vertex (v ∈ the writable representation) do
    if (v's adjacency list contains any deleted edges
        or (copy-large and the vertex degree ≥ cutoff)
        or (copy-small and the vertex degree ≤ cutoff))
    then
        copy the entire adjacency list into the new level
    else
        copy the modified edges into the new level
    end if
end for
```

Note that in some embodiments, a hybrid (or parameterized) variant of the mutable multilevel data structures may implement next pointers, such as those described in reference to the space-optimized variants. In such embodiments, it may not be necessary for the hybrid (parameterized) variant to include an extra bit in the vertex table to indicate whether or not the complete adjacency list was copied.

Figure 10:
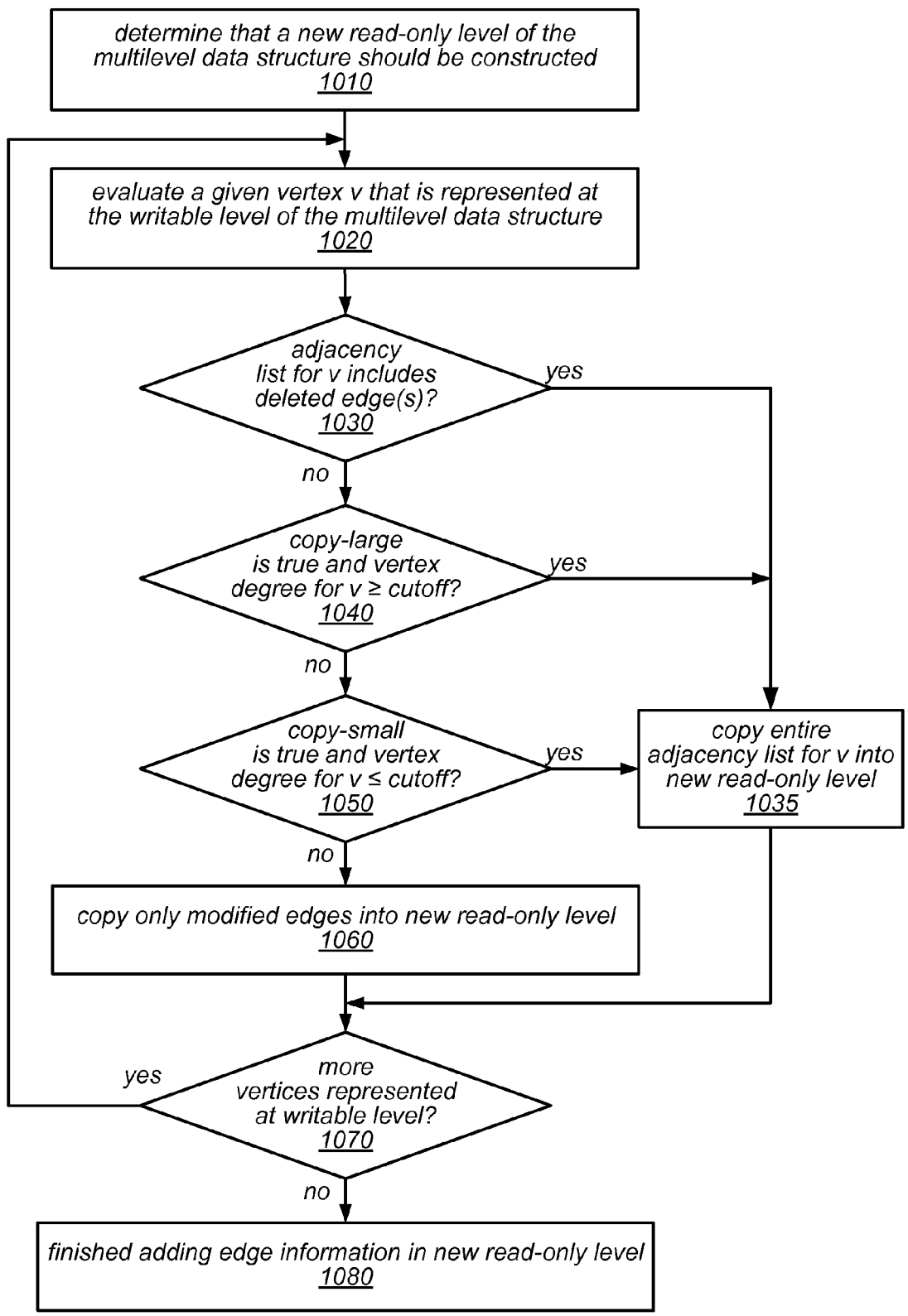
FIG. 10 is a flow diagram illustrating one embodiment of a hybrid method for creating a new read-only level in a mutable multilevel data structure that represents a graph structure.

One embodiment of a hybrid method for creating a new read-only level in a mutable multilevel data structure that represents a graph structure (such as those described herein) is illustrated by the flow diagram in FIG. 10. As illustrated at 1010, in this example, the method may include determining that a new read-only level of the multilevel data structure should be constructed. For example, a new read-only level may be created periodically (e.g., based on the value of a hard timer), based on the number of modifications that have been made to the graph structure since the last time a read-only level was created, based on the size of the single writable level (e.g., the size of a delta map at the single writable level), based on an explicit request to create a new read-only level, or based on some other criteria or policy, in different embodiments. As illustrated in this example, the method may include evaluating a given vertex v that is represented (with updated adjacency list information) at the single writable level of the mutable multilevel data structure (as in 1020). If the adjacency list for vertex v includes any deleted edges (shown as the positive exit from 1030), the method may include copying the entire adjacency list for vertex v into a new read-only level in the mutable multilevel data structure (as in 1035).

As illustrated in this example, if the adjacency list for vertex v does not include any deleted edges (shown as the negative exit from 1030), the method may include determining the value of one or more copy mode configuration parameter values (e.g., parameter values indicating selection of one of two or more supported copy policies) and/or comparing the degree of the vertex to one or more pre-determined threshold values. As illustrated in the example embodiment in FIG. 10, if a copy-large parameter value is true and the degree of vertex v is greater than or equal to a pre-determined degree cutoff value (shown as the positive exit from 1040) or if a copy-small parameter value is true and the degree of vertex v is less than or equal to a pre-determined degree cutoff value (shown as the positive exit from 1050), the method may also include copying the entire adjacency list for vertex v into a new read-only level in the mutable multilevel data structure (as in 1035).

If none of the conditions illustrated in 1030, 1040, and 1050 are true (shown as the negative exit from 1050), the method may include copying only the modified edges of vertex v into a new read-only level (as in 1060), i.e., copying to the new read-only data structure only the elements of the adjacency list for vertex v that have been modified since the last time that the last (immediately previous) read-only level was created in the mutable multilevel data structure.

As illustrated in FIG. 10, while there are more vertices represented at the single writable level of the mutable multilevel data structure (shown as the positive exit from 1070), the method may include repeating the operations illustrated in 1020 to 1080 (as applicable) for the additional vertices. This is illustrated in FIG. 10 by the feedback from 1070 to 1020. If (or once) there are no additional vertices represented at the single writable level of the mutable multilevel data structure (shown as the negative exit from 1070), the addition of edge information in the new read-only level of the mutable multilevel data structure may be complete (as in 1080).

Note that, in some embodiments, the values of the "copy-large", "copy-small" and/or "cutoff" parameters described in the example above may be initially and/or dynamically (e.g., at runtime) configurable by a user (or application code), an administrator (or operating system code), according to various policies and/or conditions. For example, in some embodiments, application code or operating system code may monitor the performance of a particular graph processing application, and may determine that a different copy policy (e.g., a "copy-large" or "copy-small" policy) may be better suited for the workload and/or may determine that the cutoff point for determining whether to copy an entire adjacency list should be raised or lowered in order to improve the performance or space utilization for the particular workload. In some embodiments, separate decisions about whether to copy an entire adjacency list may be made (e.g., statically or dynamically) for each vertex. For example, in some embodiments, application code or operating system code may monitor the number of changes made to the edge sets of various vertices and may adjust the copy policy and/or a cutoff parameter value based on how busy a particular vertex is. In one example, if a particular vertex is very busy and it does not have a particularly large edge set (adjacency list), a decision may be made to always copy the entire adjacency list to a new read-only level when there are changes, which may result in better cache locality (and better performance). In this example, if another vertex is not particularly busy, a decision may be made not to copy the entire adjacency list to a new read-only level when changes are made to this other vertex.

Note that a method for creating a new read-only level in an embodiment of the hybrid mutable multilevel data structure that always follows a "copy-large" policy (and does not also support a "copy-small" policy) may be similar to the method illustrated in FIG. 10 except that element 1050 would be elided and there would be no need to test whether a "copy-large" parameter were true in element 1040. Similarly, a method for creating a new read-only level in an embodiment of the hybrid mutable multilevel data structure that always follows a "copy-small" policy (and does not also support a "copy-large" policy) may be similar to the method illustrated in FIG. 10 except that element 1040 would be elided and there would be no need to test whether a "copy-small" parameter were true in element 1050.

In general, any of a variety of different variants of the mutable multilevel data structures described herein (including, but not limited to, the specific variants described herein) may be used represent graph structures, and may improve the performance and/or space utilization of computations and other graph processing applications that access those representations. In some embodiments, multiple variants may be supported and a user or administrator may select a specific variant (such as a performance-optimized variant, a space-optimized variant, or a hybrid variant) by setting appropriate preprocessor directives or configuration parameter values during initialization (e.g., at compile time) or during runtime (as described above).

Copy-on-Write Arrays

As noted above, in some embodiments, a software-based technique may be used to implement copy-on-write arrays, which may be used to implement the vertex tables of the mutable multilevel data structures described herein and/or various tables that store node and edge properties. For example, in some embodiments, there may be separate arrays (tables) for each property, each of which includes a respective property value for each edge or vertex. In other embodiments, a single array (table) may store composite property values for each edge or vertex. In some embodiments, each copy-on-write array (table) may be split into equal-sized data pages, each of which holds $2^m$ elements for some fixed value m. In such embodiments, an indirection array may contain pointers to the appropriate data pages for various elements. For example the $i^{th}$ element may be accessed by first looking up the appropriate data page using the value stored in the (64−m) most significant bits of i and then locating the specific element within the page using the remaining m bits.

Figure 11:
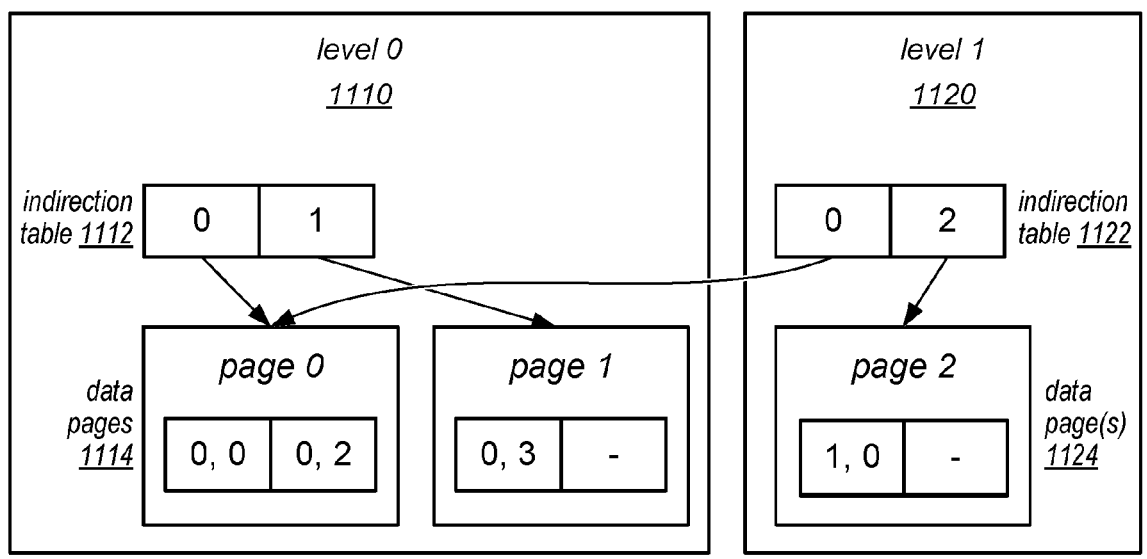
FIG. 11 is a block diagram illustrating a copy-on-write array that is split into multiple fixed-size pages and includes an indirection table, according to one embodiment.

In one example, FIG. 11 illustrates a copy-on-write array that is split into multiple fixed-size pages and includes an indirection table (or array), according to at least some embodiments. Note that while this example illustrates an embodiment in which there are only two elements per page (for clarity), in many (if not most) embodiments, the number of elements per page may be much higher. For example, in some embodiments, the value of m may be chosen to be high enough so that the entire indirection table fits in the cache (e.g., m may have a value of 10 or more).

The example illustrated in FIG. 11 represents a copy-on-write array for the multilevel vertex table of FIG. 5, assuming that m=2. In this example, level 0 of the vertex table (which is shown as 1110 and which corresponds to vertex table 512 in FIG. 5) includes an indirection table 1112 and multiple data pages 1114 (e.g., page 0 and page 1), while level 1 of the vertex table (which is shown as 1120 and which corresponds to vertex table 522 in FIG. 5) includes an indirection table 1122 and a single data page 1124 (e.g., page 2). In this copy-on-write representation, the indirection tables at each level of the mutable multilevel data structure indicate which data pages must be visited to find the information about each vertex at that particular read-only level (i.e., which pages collectively make up the vertex table at that level). In the example illustrated in FIG. 11, the indirection table 1112 indicates that, at level 0, data pages 0 and 1 should be consulted in order to locate information about the vertices at that read-only level. In this example, the first data page of the copy-on-write array is page 0, and the information for vertices corresponding to the indices 0 to 1 are found on this page (in the first and second elements, respectively). Here, the second data page of the copy-on-write array is page 1, and the information for vertices corresponding to the indices 2 to 3 are (or would be) found on page 1 (in the first and second elements, respectively). Note that at level 0, the graph does not include a vertex with the index 3. Therefore, the second element on page 1 is empty (e.g., it may store the value NIL).

In this representation, each read-only level has its own edge table array, and each of the edge identifiers stored in the elements of the data pages that collectively make up the vertex table at each level is a tuple consisting of the level number at which the corresponding adjacency list can be found and an index into the edge table at that level. For example, the first element in data page 0 includes the tuple (0,0), indicating that the adjacency list for vertex 0 can be found in the edge table of level 0 beginning at element 0 (the first element). Similarly, the second element in data page 0 includes the tuple (0,2), indicating that the adjacency list for vertex 1 can be found in the edge table of level 0 beginning at element 2 (the third element), and the first element in data page 1 includes the tuple (0,3), indicating that the adjacency list for vertex 2 can be found in the edge table of level 0 beginning at element 3 (the fourth element).

In the example illustrated in FIG. 11, the entries in the indirection table 1122 indicate that, at level 1, data pages 0 and 2 should be consulted in order to locate information about the vertices at that read-only level. In this example, since the adjacency lists for the vertices 0 and 1 in the graph did not change between the time that the level 0 read-only CSR 510 was created and the time that the level 1 read-only CSR 520 was created, the adjacency lists for these vertices that are referenced on page 0 at level 0 also represent the adjacency lists for these vertices on level 1. However, since the adjacency list for vertex 2 changed between the time that the level 0 read-only CSR 510 was created and the time that the level 1 read-only CSR 520 was created, the adjacency list for vertex 2 that was referenced on page 1 at level 0 no longer represents the adjacency list for this vertex on level 1. Instead, the adjacency list for vertex 2 can be found in the edge table of level 1 beginning at element 0 (the first element), as indicated by the reference (e.g., the tuple) in the first element on data page 2. Note that at level 1, the graph still does not include a vertex with the index 3. Therefore, the second element on page 2 is empty (e.g., it may store the value NIL).

In some embodiments of the copy-on-write enabled vertex tables described herein, when the vertex table changes (e.g., when it is written to), a new level is created for the vertex table and only the affected data pages are stored at the new level. In such embodiments, the indirection table at the new level will point to the data pages that changed (and which are found on the new level) and the data pages that did not change (which are found on other, lower, levels).

Figure 12:
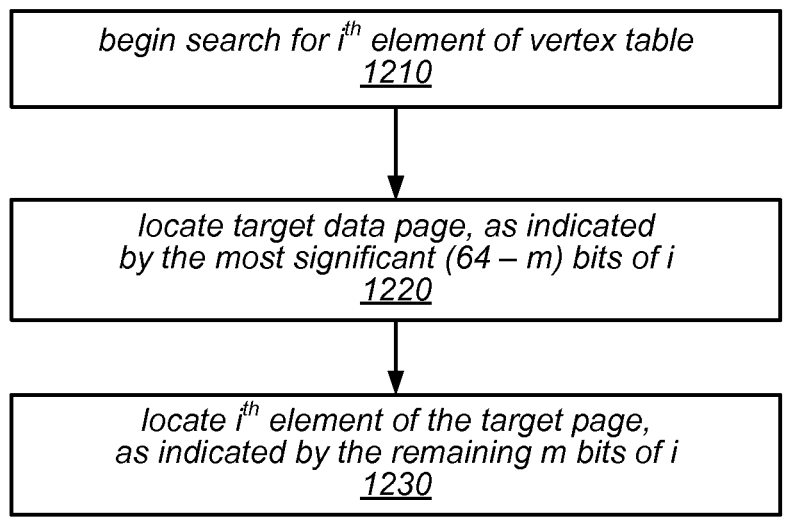
FIG. 12 is a flow diagram illustrating one embodiment of a method for traversing a copy-on-write vertex table of a mutable multilevel data structure to locate a particular vertex table element.

One embodiment of a method for traversing a copy-on-write vertex table of a mutable multilevel data structure (such as those described herein) to locate a particular vertex table element is illustrated by the flow diagram in FIG. 12. As illustrated in this example, in response to beginning a search for $i^{th}$ element of the vertex table (as in 1210), the method may include locating the target data page, as indicated by the most significant (64−m) bits of i (as in 1220), where each data page holds $2^m$ elements. The method may also include locating the $i^{th}$ element on the target page, as indicated by the remaining m bits of i (as in 1230).

The performance of a software copy-on-write vertex table implementation and two alternative vertex table implementations were evaluated using two representative graph processing algorithms, including a triangle counting algorithm, which often results in worst-case behavior. More specifically, the two different graph processing algorithms were computed over a 10 million node uniformly random graph. In this evaluation, it was found that the overhead of the copy-on-write design described above (relative to flat arrays) was 5.0% in the worst case and was comparable to the use of flat arrays in more common real-world algorithms. Experiments with a hardware-assisted copy-on-write implementation were abandoned because of its lack of portability and poor performance relative to the software copy-on-write vertex table implementation (due to a high number of TLB misses).

Persistent Representations of the Mutable Multilevel Data Structures

In some embodiments, the mutable multilevel data structures described herein may be implemented as in-memory representations of graph structures. These in-memory representations may be substantially similar to those described above. However, they may be made more suitable for graph structures that are larger than the available memory by leveraging memory mapping and demand paging. For example, they may leverage an operating system call such as "mmap" to map the pages on which portions of the mutable multilevel data structures described herein (e.g., vertex tables, edge tables, deletion vectors, indirection arrays, and/or data pages of various copy-on-write arrays) that are stored in a persistent storage component (e.g., a hard disk or flash memory component) into memory (e.g., into the local system memory) for processing. In such embodiments, the mutable multilevel data structures and/or graph structures they represent may be stored in their entirety in a persistent storage component, but the operating system may only copy a page into physical memory (e.g., into the local system memory) if an attempt is made to access it and that page is not already in memory (i.e., if a page fault occurs), and the operating system may bring data pages in and out of memory as needed. In general, using mmap may be a good way to perform computations on data structures that are larger than the available memory as well as on data structures that fit in the memory, because it eliminates the overhead of buffer management (especially that incurred from pinning pages).

This may be especially beneficial for the performance of computations on representations of graph structures that fit entirely in memory, in which case, after the operating system loads in all pages, computations may be performed on the graph structures with essentially zero additional overhead, when compared to dedicated in-memory solutions.

As previously noted, copy-on-write arrays may be used to implement the vertex tables and the property tables of the mutable multilevel data structures described herein. On persistent storage, there may be a default number of consecutive levels stored in one file. For example, in one embodiment, the default may be to store k=16 consecutive levels in one file. Limiting the number of levels per file may make it easier to reclaim space from deleted levels, since levels may typically be deleted in age order.

In some embodiments, the on-disk representation of a copy-on-write array may be nearly identical to its in-memory representation. Each file may begin with a header that contains the metadata of each level stored in the file, including the offsets of the corresponding indirection tables and ranges of data pages. In one example, the indirection table may be stored as an array of data structures (or structs) consisting of the following fields:

A level number, which is a 4-byte integer identifying the level (and therefore file) that owns the page An offset, which is an 8-byte integer indicating the offset within the appropriate file in which the page resides In some embodiments, if the indirection table at a given level is identical to that of the indirection table at one of the previous levels (i.e., if there are no modifications), rather than storing a duplicate indirection table, a reference to the previous level may be stored. In some embodiments, the data pages for a given level may be stored contiguously in the file for that level. In some embodiments, the data may be loaded into memory in ascending order of the level identifiers. For each level, the appropriate data pages from the file may be memory mapped (e.g., using mmap) and the in-memory indirection array (which contains pointers to the corresponding mmap-ed regions) may be built. In such embodiments, accessing an element using its index may involve two pointer dereferences. In some embodiments, the indirection table for the most recent (writable) level may always be kept in memory in order to be able to determine which level owns the given data page and to copy it upon a write, if necessary.

Note that in some embodiments, a copy-on-write array may be allocated with more capacity than is currently needed with only a small space penalty. In such embodiments, entries in the indirection array that refer to not-yet-populated pages may all reference a single zero-filled page, which may be updated using a copy-on-write mechanism as necessary. In one example, with 4 KB data pages, reserving space for one million eight-byte elements may require only 16 KB in memory (i.e., 8 bytes per data page) or 24 KB on disk (e.g., one 4-byte snapshot ID plus one 8-byte offset per data page), plus the zero-filled page.

In some embodiments, the following three invariants may be maintained:

If a level does not store its own indirection table but references that of an older level, it either references the indirection table of the previous level or of some even earlier level, which is also referenced by the previous level.

If an indirection table at some position references a data page from a prior level, the indirection table of the previous level at that same position points to the same page.

A data page is always referenced from the same index in every indirection table (with the exception of the special zero-filled page).

These invariants may make it easy to determine if a particular data page and/or an indirection block has more references and if so, to find and update them if necessary (such as when deleting a level).

In some embodiments, these copy-on-write arrays may be used as primitive building blocks upon which to build a persistent representation of one of the mutable multilevel data structures described herein, producing a system for high-performance graph analytics capable of executing efficiently regardless of whether the graph fits in memory or not. In such embodiments, the persistent representation of one of these mutable multilevel data structures may represent a graph using a variant of a compressed sparse row (CSR) representation. The graph consists of two data structures:

An edge table, which is a persistent, flat mmap-ed array containing consecutive adjacency lists for each vertex.

A vertex table, which is a copy-on-write array mapping vertex IDs to per-vertex structs, each containing an offset into the edge table where the corresponding adjacency list starts, the number of elements in the adjacency list, and the vertex degree.

As described in previous examples, vertex property values for each vertex property may be stored in its own copy-on-write array parallel to the vertex table, and edge property values for each edge property may be stored in a copy-on-write array parallel to the edge table.

The Writable Level

As noted above, in various embodiments, a data structure at the single writeable level of the mutable multilevel data structures described herein may be implemented in a manner similar to a delta map, may be implemented as a log of modifications to the graph structures that are represented by the mutable multilevel data structures (e.g., as a list of new or deleted vertices and/or new or deleted edges between various vertices), or may be represented by any of a variety of simple or complex data structures at the single writable level. In some embodiments, modifications made to a graph structure represented by one of the mutable multilevel data structures described herein may be collected in the data structure at the single writable level and applied to the multilevel data structure in batches, which may include creating a new read-only level based on the information collected in the data structure at the single writable level.

In some embodiments, the writable level of the mutable multilevel data structure may, when it is created, be similar to the copy-on-write arrays described above. For example, it may include an indirection table and multiple data pages that collectively implement a sparse vertex table, and the data pages for particular collections of vertices may be allocated only if (and when) they are needed (e.g., when those vertices are added, deleted, and/or their edge sets are modified). In some embodiments, the writable level may include a vertex table in which each element contains either a NIL value (if the corresponding vertex has no modified edges) or a vertex object that contains a growable array of added and removed incoming and/or outgoing edges. The vertex table copy-on-write indirection table may start out empty (e.g., when created), and may demand allocate data pages as needed. In order to allow new vertices to be added, more memory may be allocated for the indirection table than is immediately necessary. For example, in some embodiments, allocating an extra 1 MB may be enough space to add approximately 15 million new vertices.

In some embodiments, the writable level may not require locks for reading, but may use a fast fine-grained latching scheme to coordinate concurrent updates (e.g., to avoid having two threads concurrently attempting to allocate the same new data page). In such embodiments, elements may be inserted into the vertex table using a compare-and-swap (CAS) type operation. For example, if a thread wishes to write a change to the vertex table, it may check the corresponding element in the indirection table. If the original value in the table is NIL, it may be replaced (e.g., using a CAS type operation) with a special value, BLOCK, after which memory for the corresponding data page may be allocated. Once the allocation succeeds, the BLOCK value may be replaced with the valid pointer to the newly allocated data page and the insertion operation may continue. On the other hand, if the value in the vertex table is BLOCK, it means that another thread is currently allocating memory. In this case, the insertion operation may loop until the value changes to a valid pointer, thus treating it as a spin-lock. In other words, if the thread wishing to write a change comes along while the BLOCK value is present in the corresponding element of the indirection table, it may wait until the BLOCK is replaced by a pointer, then will go to the newly allocated data page (as indicated by the pointer) and make the desired change.

In some embodiments, a similar mechanism may be used to coordinate concurrent writes/updates to previously allocated data pages (by concurrent writers). For example, if a thread wishes to add or update a vertex object on an existing data page, it may examine the corresponding element of the data page. If the original value on the data page is NIL, it may be replaced (using a CAS type operation) with a special value, BLOCK, after which memory for the corresponding object representing the vertex may be allocated. Once the allocation succeeds, the BLOCK value may be replaced with the vertex object and the write operation may continue. In some embodiments, read-only operations may treat the BLOCK value as a NIL value (recall that the only time the value is BLOCK is during allocation) and thus may not require any locks. In some embodiments, compiler fences may be placed where necessary.

As noted above, the vertex objects may be growable arrays of added and removed incoming and/or outgoing edges. In some embodiments, these growable arrays may be implemented using a thin indirection layer that allows them to grow without having to move any of their contents in memory, and items may be deleted from these arrays by setting a flag instead of shifting the contents. In some embodiments, when a thread adds an edge, it may latch (or lock) both endpoints of the new edge, append the new edge information to the ends of the adjacency lists for both endpoints, update any counters for those endpoints (e.g., counters whose values indicate the length of the adjacency list for each of the endpoint vertices or the number of newly added edges and/or counters whose values indicate the pre-computed degree of each of the endpoint vertices), and release the latches. In some embodiments, the latches (or locks) may be acquired in the order of their vertex IDs in order to prevent deadlocks, thus threads may not need to acquire any latches/locks in order to read the adjacency lists. In some embodiments, node metadata (e.g., the pre-computed vertex degree) may be read without locking, leveraging the atomicity of word accesses (for some processors).

Figure 13:
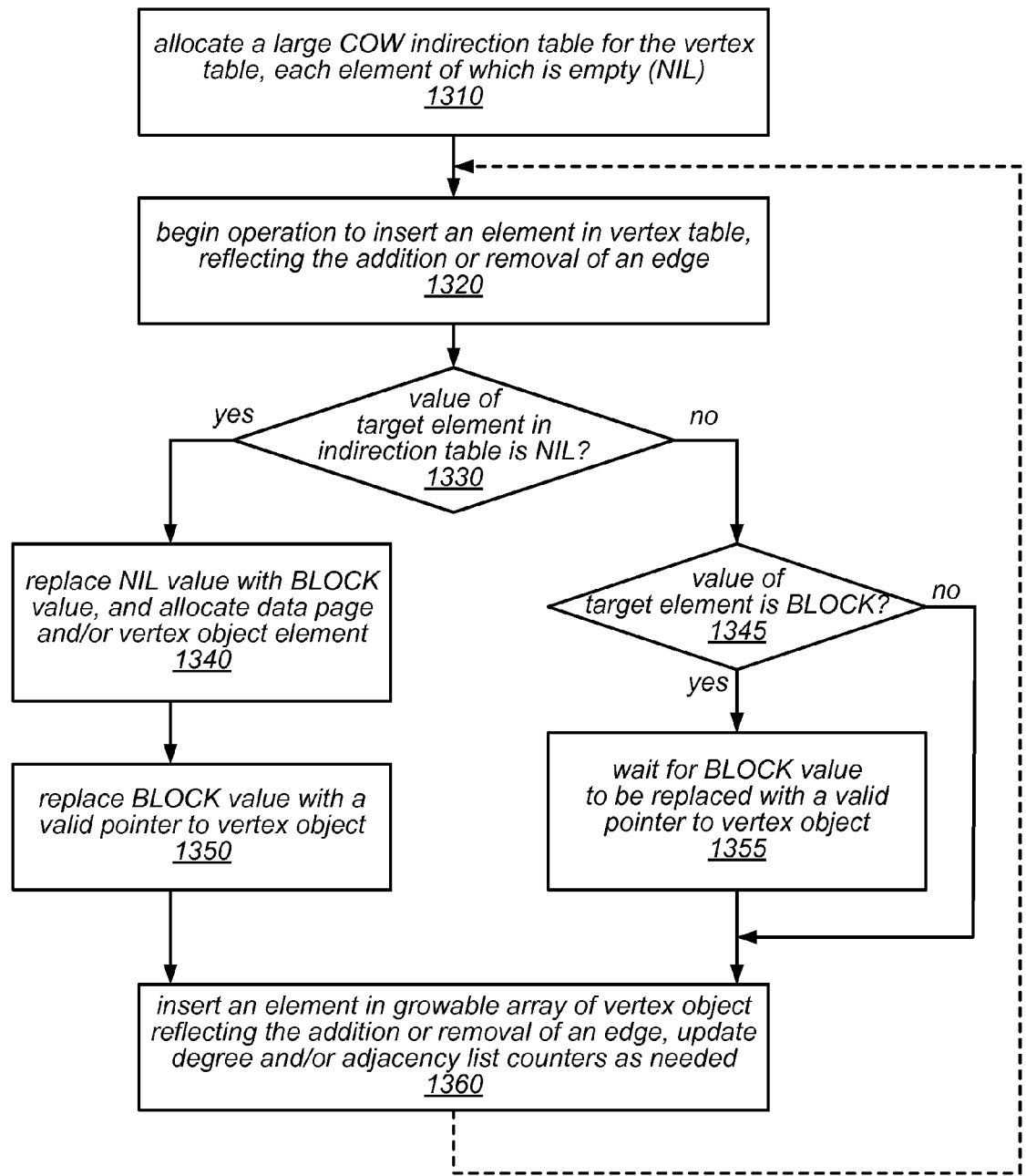
FIG. 13 is a flow diagram illustrating one embodiment of a method for managing changes to the single writable level of a mutable multilevel data structure.

One embodiment of a method for managing changes to the single writable level of a mutable multilevel data structure (such as those described herein) is illustrated by the flow diagram in FIG. 13. As illustrated as 1310, in this example, the method may include allocating a large copy-on-write indirection table for the vertex table, each element of which is empty (e.g., each element may be set to a value of NIL). In response to beginning an operation to insert an element into the vertex table that reflects the addition or removal of an edge (as in 1320), the method may include determining whether the value of the target element in the indirection table (e.g., an element representing a data page or a vertex object) is NIL (as in 1330). If so (shown as the positive exit from 1330), the method may include replacing the NIL value with a special BLOCK value (e.g., to indicate that a change to the element is in progress), and allocating a new data page and/or a new vertex object element, as appropriate (as in 1340). For example, if the target data page does not exist, a new data page and a new vertex object element may be allocated. However, if the target data page exists, but no vertex object element for the target vertex exists on the target data page, a new vertex object element may be allocated on the target data page. Once memory for the target data page and/or vertex object element has been allocated, the method may include replacing the special BLOCK value with a valid pointer to the target vertex object, as in 1350.

As illustrated in FIG. 13, if the value of the target element in the indirection table (e.g., an element representing a data page or a vertex object) is not NIL (shown as the negative exit from 1330), the method may include determining whether the value of target element is BLOCK (as in 1345), which may indicate that another thread is making a change to the target data page and/or vertex element. In this case, the method may include waiting for the BLOCK value to be replaced with a valid pointer to a corresponding vertex object, as in 1355. If the value of target element is a valid pointer to the corresponding vertex object (shown as the negative exit from 1345), or once a NIL or BLOCK value has been replaced by a valid pointer, as shown at 1350 or 1355), the method may include inserting an element in a growable array of vertex objects that reflects the addition or removal of an edge, and updating degree and/or adjacency list counters for the affected vertex, as needed (as in 1360).

As illustrated by the dashed line from 1360 to 1320, the operations illustrated in 1320-1360 may be repeated, as appropriate, when and if additional changes are made on the single writable level of the mutable multilevel data structure. Note that, in some embodiments, when an edge is added to the graph structure, the adjacency lists of both endpoints may be updated in the vertex table at the writable level (e.g., using the method illustrated in FIG. 13).

Sliding Window

In some embodiments, applications may perform computations on new graph edges (or on batches of new edges) as they are received (e.g., in a stream of requests to add them to a graph structure represented by one of the mutable multilevel data structures described herein). Such applications may benefit from an ability to efficiently maintain a sliding window that automatically ages off the oldest edges, removing them from consideration at various points during the computation. For example, a sliding window may include only up to the last N edges received or only the edges received within the last T seconds. In some embodiments, this may be achieved by using the space-optimized variant of the mutable multilevel data structures described herein (with or without the next pointers) and adding the ability to declare a certain level (e.g., a level other than level 0) to be the lowest level when reconstructing an adjacency list. In such embodiments, the sliding window may be advanced (periodically) as follows: create a new read-only level from the new edges and then age off the old edges by setting the second to oldest level in the window as the new lowest level. Note that, in some such embodiments, old read-only levels may be deleted (periodically) in order to reclaim memory. This approach may only support computations on streams of new edges. In other embodiments, streams that indicate the deletion of edges may be supported using a deletion vector, if the application requires this feature.

In one example, a one hour long sliding window may be maintained over a stream of edges and the window may be advanced every ten minutes. In this example, a new read-only level may be created every ten minutes. Therefore, after the first hour, the data structure would include levels 0 through 5. Ten minutes later, the sliding window may be advanced by creating read-only level 6 and setting the lowest read-only level to 1. In this way, when an adjacency list is reconstructed, only edges from levels 1 through 6 would be included in the adjacency list, i.e. the edges added between the 10th and the 70th minutes. At this point, since level 1 is now the lowest level under consideration during computations, level 0 may be safely deleted. This may be done either immediately or at some other (possibly more convenient) time.

Note that if enough bits are reserved for level identifiers, they might never all be used. For example, if 32 bits are used for level identifiers, it would take more than one hundred years to run out of level identifiers, even if the sliding window were advanced every second. In some embodiments, if a smaller number of bits is used, the level identifier values may wrap around the identifier space when the end is reached, and old level identifiers may be reused. For example, if 8-bit level identifiers are used and a sliding window is maintained that consists of no more than $2^8$ levels, the next level after level 255 may be again called level 0.

Evaluation

Different variants of the mutable multilevel data structures described herein (e.g., performance-optimized, space-optimized, and hybrid versions) were evaluated using a variety of representative graph analytics algorithms, such as triangle counting (which is at the core of several clustering coefficient algorithms and other graph processing algorithms), page ranking, a representative Markov chain algorithm, and a weighted algorithm for finding a single-source shortest path (SSSP). These algorithms were applied to a synthetically generated graph (e.g., one that follows the Barabási-Albert model) with 9 million nodes, 45 million edges, two node properties (one string and one integer), and one edge property. The graphs followed a preferential attachment pattern found in real-world graphs. The evaluated algorithms may be categorized into two classes based on how much computation they perform relative to how much they traverse the graph structure, which closely corresponds to their performance characteristics in the space-optimized variant:

Structure-light algorithms, where traversals do not dominate performance. Most real-world algorithms fall into this category.

Structure-heavy algorithms, which are entirely dominated by graph traversal with practically no other computation.

The performance-optimized variant (referred to herein as "DG-P"), the space-optimized variant (referred to herein as "DG-S"), an "insert-only" version of the space-optimized variant with no support for deletions (referred to herein as "I-DG-S"), and hybrid variants were evaluated (along with the original read-only CSR representation) in order to determine the cost of providing mutability, compute the per-level overhead, and determine the overhead of the writable representation, and, by examining different cutoffs and parameter value settings, to evaluate the trade-offs between space and performance (time).

For structure-light algorithms, the performance of both the performance-optimized and space-optimized variants was found to closely track the performance of the original CSR representation and to yield a significant improvement over a CSR representation that has been augmented with a delta map. In other words, the performance of these variants may be roughly comparable to the original (single-level) CSR representation, and it may not degrade (or it may degrade very slowly) as the number of levels into which the graph is loaded increases. The performance-optimized variant (DG-P) was shown to have nearly identical performance to the original CSR representation regardless of whether the read-only levels are merged, indicated that there is usually no need to merge read-only levels to improve performance. However, merging the graph fully into a single level may enable graph processing algorithms to use optimized, hard-coded accesses, which may allow them to run as fast as on the original CSR representation. In addition, merges may be necessary to keep the memory usage under control, in some embodiments. The evaluation results showed that memory usage of the performance-optimized variant (without merging) grows much faster than with the other alternatives (e.g., at about twice the rate) as the number of levels into which the graph is loaded increases. However, merging levels may bring the memory usage down to a small, approximately constant factor of the memory usage of the original CSR representation, which is the lowest achievable bound. The memory usage of the space-optimized variant (DG-S), with and without merging, was shown to closely track this lower bound. The overhead relative to the original CSR representation is primarily due to the copy-on-write nature of the vertex table and the inclusion of the pre-computed node degree. The full-featured implementation of the space-optimized variant with support for deletions was shown to be about 20% slower than the original CSR representation. However, disabling deletions for applications that do not need them, and using a copy-on-delete policy using the "next" pointers (as in I-DG-S), was shown to increase the performance to that of the performance-optimized variant. Therefore, it was shown that merging is rarely necessary. As in the case of the performance-optimized variant, merging the entire graph to one read-only level may yield performance that is nearly identical to that of the original CSR representation.

An implementation of an original CSR representation that was augmented with a delta map (which was used as a second baseline) was evaluated for comparison, and resulted in significantly lower performance and greater memory usage, as expected. In this evaluation, every node and every edge was stored as a separate object with multiple fields. While it may be possible to implement a delta map more compactly, such as by employing a lower-overhead memory allocation method, the amount of consumed memory would be still significantly larger than if the same data were stored in a CSR representation alone. Considering how closely the performance of the space-optimized variant of the mutable multilevel data structures described herein is to the original CSR representation, especially when deletions are disabled, these evaluations show that it is superior to the performance-optimized variant even without merges. Thus, for structure-light algorithms, the use of the hybrid variant described herein may not add any benefit.

In contrast to structure-light algorithms, structure-heavy algorithms elicit a significant difference between the performance-optimized and space-optimized variants of the mutable multilevel data structures described herein. With these algorithms, merging levels was shown to keep the runtime a constant factor slower than the original CSR representation and well below the runtimes of the original CSR representation augmented with a delta map. Disabling support for deletions was shown to improve the performance further by a constant factor, but it did not decrease the rate at which the runtimes on unmerged graphs grow. The memory usage was shown to be similar to that described above for structure-light algorithms. The performance-optimized variant (DG-P), with and without merging, was consistently slower (e.g., up to 25% slower) than the original CSR representation, but was shown to be superior to both the original CSR representation augmented with a delta map and the space-optimized variant. While the performance-optimized variant delivered a better, more predictable performance, using the space-optimized variant (with or without merging) may be more appropriate if memory usage is a concern. As described above, a hybrid variant of the mutable multilevel data structures described herein may provide a mechanism for dynamically making trade-offs between memory and performance in a graceful manner.

Some evaluations of the hybrid variants described herein focused on the memory usage and the performance of various triangle counting algorithms using different policies that decide whether to copy entire adjacency lists or to represent adjacency lists as deltas depending (at least in part) on a node degree threshold. As previously described, the two policies described herein may provide a gradual transition for memory usage between the performance-optimized and space-optimized variants depending on how many adjacency lists are copied. Using one triangle counting algorithm, the performance of these hybrid variants was found to follow a similar trend, clearly showing the inverse relationship between the memory usage and the average runtime as the value of the cutoff parameter indicating whether or not to copy the adjacency list varies, although it does not approach the performance of the performance-optimized variant even when all adjacency lists are copied. Note that in the hybrid variants described herein, the iterator requires extra logic to determine whether to descend to a previous level whenever it reaches an end of an adjacency list fragment. This extra overhead accounts for the bulk of the difference between the performance-optimized variant and a hybrid variant policy that copies all adjacency lists, such as if the degree≥0. However, using a much faster triangle counting algorithm, the difference between the performance-optimized variants and the space-optimized variants was found to be greatly reduced.

Through these evaluations, it has been determined (empirically) that a policy in which the adjacency lists are copied for nodes with degrees≤16 may be suitable for a variety of workloads. When implementing this policy, the memory usage was found to be approximately midway between that of the space-optimized and performance-optimized variants. In addition, the constant overhead factor over the original CSR representation was found to be approximately the same as for the space-optimized variant, but it continues to grow at a significantly more reasonable rate. When examining the policies that copy a small number of large adjacency lists, the performance curves were found to grow as steeply as in the space-optimized variant.

When evaluating the mutable multilevel data structures described herein on other graph processing applications and/or with other graph structures, the execution times of the performance-optimized variant (DG-P) were generally found to be comparable to the original CSR representation and significantly better than the original CSR representation augmented with a delta amp. The performance in the space-optimized variant was found to be somewhat lower for structure-light algorithms and significantly lower for structure-heavy algorithms. The results further revealed that there are in fact many graphs and graph processing applications in which merging in the space-optimized variant results in only marginal increases in performance (unless they employ hard-coded accesses to a level 0 read-only CSR-like representation). The execution times for the unmerged graph representation were found to remain a constant factor of the original CSR representation even as the number of levels increased. In the case of the unmerged graph, the runtimes were found to grow quickly as the number of levels increased because it has significantly more small-degree nodes distributed over a larger number of levels (which results in more level switches and, correspondingly, worse cache behavior).

As graphs are becoming more rich and dynamic, it may be prudent to consider both performance and memory usage when choosing a data structure to represents those graphs in memory. The mutable multilevel data structures described herein may be used to represent a wide variety of such graphs for many different workloads. In various embodiments, these mutable multilevel data structures may be more flexible and/or may yield space and/or performance improvements over previous efforts to create mutable CSR-like data structures. The performance-optimized variant described herein may subsume log-based CSR representations, while restricting the number of read-only levels in the performance-optimized variant may subsume an approach in which a read-only CSR representation is augmented with delta map.

Evaluations have also provided insights related to persistence and performance for graph structures that are larger than the available memory. For example, the space-optimized variant that implements next pointers was shown to perform the best as the graph grows much larger than memory. On the other hand, the performance-optimized variant was shown to work best as long as the graph structure fits in memory, but its performance becomes worse as the graph becomes larger than memory.

Evaluations have shown that while the performance-optimized variant delivers the best performance across the board, the memory usage grows quickly with the number of changes to the graph representation. It was further demonstrated that there exists a large class of important graph processing algorithms (e.g., those referred to herein as structure-light algorithms or other less structure-intensive applications) for which a space-optimized variant with low memory overhead and negligible-to-low performance overhead may be well suited. Note that this was true for space-optimized variants with and without the next pointers described herein. For other graph processing algorithms (e.g., those referred to herein as structure-heavy algorithms or other structure-intensive applications), it has been demonstrated that they may benefit from the use of the performance-optimized variant described herein or a hybrid variant, depending on the amount of available memory and/or the ability to run maintenance operations on the data structure in order to keep the memory usage under control.

In various embodiments, the flexibility of the mutable multilevel data structures described herein may allow the use of this graph representation to be adapted for different workloads. For example, even though a particular mutable multilevel data structure may include multiple read-only levels, a computation for which fresh (up-to-date) information is not essential may be run on the mutable multilevel data structure beginning at the most recently created read-only level (ignoring any changes that are reflected on the single writable level) or may be run entirely on the level 0 read-only data structure (without having to access multiple levels).

Figure 14:
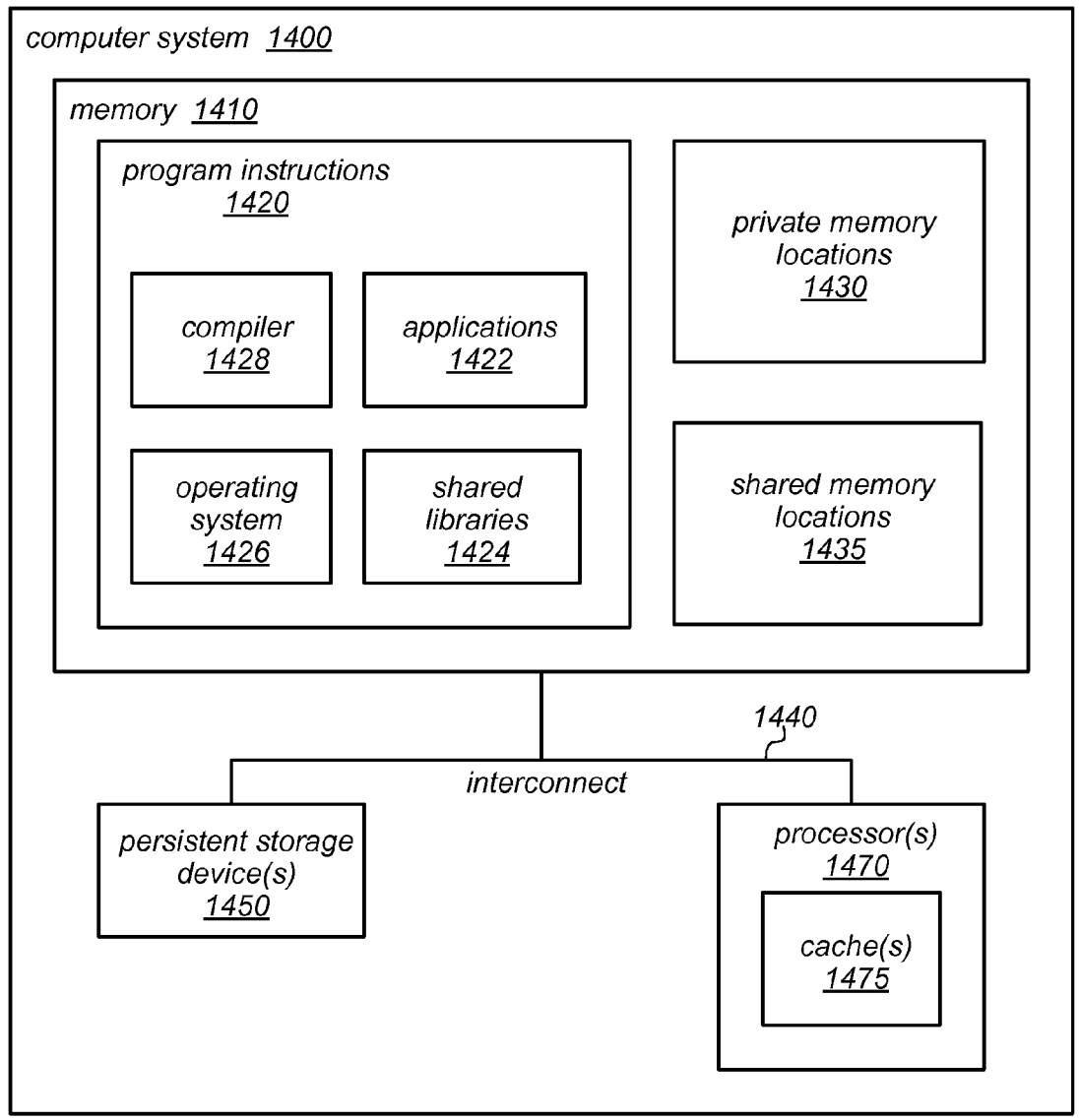
FIG. 14 is a block diagram illustrating one embodiment of a computing system that is configured to implement creating and using a mutable multilevel data structure to represent a graph structure and/or for processing a graph structure by traversing and/or updating such a mutable multilevel data structure.

The techniques described herein for creating and using a mutable multilevel data structure to represent a graph structure and/or for processing the graph structure by traversing and/or updating the mutable multilevel data structure may be implemented on or by any of a variety of computing systems, in different embodiments. For example, FIG. 14 illustrates a computing system 1400 that is configured to implement creating and using a mutable multilevel data structure to represent a graph structure and/or for processing a graph structure by traversing and/or updating such a mutable multilevel data structure, according to various embodiments. The computer system 1400 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

The mechanisms for implementing creating and using a mutable multilevel data structure to represent a graph structure and/or for processing the graph structure by traversing and/or updating such a mutable multilevel data structure, as described herein, may be provided as a computer program product, or software, that may include a non-transitory, computer-readable storage medium having stored thereon instructions, which may be used to program a computer system 1400 (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

In various embodiments, computer system 1400 may include one or more processors 1470; each may include multiple cores, any of which may be single or multi-threaded. For example, multiple processor cores may be included in a single processor chip (e.g., a single processor 1470), and multiple processor chips may be included in computer system 1400. Each of the processors 1470 may include a cache or a hierarchy of caches 1475, in various embodiments. For example, each processor chip 1470 may include multiple L1 caches (e.g., one per processor core) and one or more other caches (which may be shared by the processor cores on a single processor). The computer system 1400 may also include one or more persistent storage devices 1450 (e.g. optical storage, magnetic storage, hard drive, tape drive, solid state memory, etc) and one or more system memories 1410 (e.g., one or more of cache, SRAM, DRAM, RDRAM, EDO RAM, DDR 10 RAM, SDRAM, Rambus RAM, EEPROM, etc.). Various embodiments may include fewer or additional components not illustrated in FIG. 14 (e.g., video cards, audio cards, additional network interfaces, peripheral devices, a network interface such as an ATM interface, an Ethernet interface, a Frame Relay interface, etc.)

The one or more processors 1470, the storage device(s) 1450, and the system memory 1410 may be coupled to the system interconnect 1440. In some embodiments, a graph structure and/or a mutable multilevel data structure representing the graph structure may be stored in one of persistent storage devices 1450 in its entirety. One or more of the system memories 1410 may contain program instructions 1420. Program instructions 1420 may be executable to implement one or more applications 1422, which may include application source code and/or executable application code that is configured to create and use a mutable multilevel data structure (such as those described herein) to represent a graph structure and/or to process a graph structure by traversing and/or updating such a mutable multilevel data structure, as described above. Program instructions 1420 may also be executable to implement one or more shared libraries 1424, or operating systems 1426. In some embodiments, program instructions 1420 may include a compiler 1428 (which may be an optimizing compiler).

In some embodiments, program instructions 1420 may include (e.g., within an application 1422, the operating system 1426, or shared libraries 1424) a graph processing module that includes program instructions that when executed by the processors 1470 perform operations on the mutable multilevel data structures described herein. For example, program instructions 1420 may include program instructions that when executed by the processors 1470 perform operations to reconstruct an adjacency list for each of one or more vertices of a graph structure that is represented by one of the mutable multilevel data structures described herein, create a new read-only level on one of these mutable multilevel data structures, merge two read-only levels of one of these mutable multilevel data structures, and/or perform other operations that target one of these mutable multilevel data structure. These functions, operations, or methods may be invoked in response to receiving explicit requests to do so, or in response to receiving requests to perform computations during which these operations would implicitly be performed, in different embodiments.

In some embodiments, program instructions 1420 may be executable to implement a contention manager (not shown). In some embodiments, program instructions 1420 may also be configured to implement a transaction support library, which provides various methods for implementing atomic transactions (e.g., within shared libraries 1424 or elsewhere within program instructions 1420). In some embodiments, a transaction support library may include functionality to execute transactions according to various hardware and/or software transactional memory techniques. For example, in some embodiments, applications 1422 may make calls into a transaction support library for beginning and ending (e.g., committing) transactions, and/or for performing one or more accesses to shared memory locations 1435 (e.g., locations within a shared transactional memory space) from within transactions.

Program instructions 1420 may be encoded in platform native binary, any interpreted language such as Java™ byte-code, or in any other language such as C/C++, the Java™ programming language, etc., or in any combination thereof. In various embodiments, compiler 1428, applications 1422, operating system 1426, and/or shared libraries 1424 may each be implemented in any of various programming languages or methods. For example, in one embodiment, compiler 1428 and operating system 1426 may be based on the Java programming language, while in another embodiments they may be written using the C or C++ programming languages. Similarly, applications 1422 may be written using the Java programming language, C, C++, or another programming language, according to various embodiments. Moreover, in some embodiments, compiler 1428, applications 1422, operating system 1426, and/shared libraries 1424 may not be implemented using the same programming language. For example, applications 1422 may be C++ based, while compiler 1428 may be developed using C.

The system memory 1410 may further comprise private memory locations 1430 and/or shared memory locations 1435 where data may be stored. For example, shared memory locations 1435 may include locations in a shared transactional memory space, which may support and/or be accessed by transactions in a software transactional memory implementation, a hardware transactional memory implementation, and/or a hardware-software hybrid transactional memory implementation, in different embodiments. In some embodiments, shared memory locations 1435 may store data or other shared resources that are accessible to multiple, concurrently executing threads, processes, or transactions, in various embodiments. In various embodiments, private memory locations 1430 and/or shared memory locations 1435 may store data representing all or a portion of one or more mutable multilevel data structures, each of which represents a graph structure, and each of which may include multiple vertex tables, edge tables, indirection tables, adjacency lists, and/or configuration parameter values, as described herein. In addition, the system memory 1410 and/or any of the caches of processor(s) 1470 may, at various times, store recorded values of local variables, counters, nonzero indicators, and/or various fields of the mutable multilevel data structures, as described herein, and/or any other data usable in implementing the techniques described herein, some of which may include values that are configurable by the programmer or by a user.

Although the embodiments above have been described in considerable detail, numerous variations and modifications will become apparent to those skilled in the art once the above disclosure is fully appreciated. For example, although many of the example embodiments are described in terms of particular mutable multilevel data structures that include multiple read-only levels and a single writable level, particular vertex tables, edge tables, and other components of these mutable multilevel data structures, and particular policies for determining when and how to create new read-only levels in these mutable multilevel data structures, it should be noted that the techniques and mechanisms disclosed herein for implementing creating and using a mutable multilevel data structure to represent a graph structure and/or for processing a graph structure by traversing and/or updating such a mutable multilevel data structure may be applicable in embodiments in which the mutable multilevel data structures are constructed from different types of structures than those described in the examples herein and/or are managed using different policies than those described in the examples herein. It is intended that the following claims be interpreted to embrace all such variations and modifications.

What is claimed:

1. A system, comprising:
one or more processors; and
a memory coupled to the one or more processors;
wherein the memory stores at least a portion of a mutable multilevel data structure that represents a graph structure;
wherein the memory further stores program instructions that when executed on the one or more processors cause the one or more processors to implement a graph processing module;
wherein in response to receiving a request to perform a computation on the graph structure, the graph processing module is configured to reconstruct an adjacency list for a given vertex of the graph structure from information stored in the mutable multilevel data structure that represents the graph structure; and
wherein the mutable multilevel data structure comprises two or more read-only data structures that collectively represent a read-only snapshot of the graph structure, wherein one of the two or more read-only data structures at a given level of the mutable multilevel data structure comprises a consistent compressed sparse row representation of the graph structure at a given point in time, wherein each of the two or more read-only data structures is located at a respective level in the mutable multilevel data structure, wherein each of the two or more read-only data structures comprises a respective vertex table and edge table, and wherein another one of the two or more read-only data structures at another level of the mutable multilevel data structure includes a vertex table with one or more references to an edge table in the one read-only data structure at the given level.

2. The system of claim 1, wherein to reconstruct the adjacency list for the given vertex, the graph processing module is configured to:
traverse one or more of the two or more read-only data structures to obtain elements of the adjacency list for the given vertex; and
add the obtained elements to the adjacency list for the given vertex.

3. The system of claim 1, wherein the mutable multilevel data structure further comprises a single writeable data structure comprising information reflecting changes made to the graph structure that are not reflected in the two or more read-only data structures, wherein the single writable data structure and the two or more read-only data structures collectively represent a current state of the graph structure.

4. The system of claim 3, wherein to reconstruct the adjacency list for the given vertex, the graph processing module is further configured to:
traverse the single writeable data structure to obtain one or more additional elements of the adjacency list for the given vertex; and
add the additional obtained elements to the adjacency list for the given vertex.

5. The system of claim 3, wherein the single writable data structure is located at a level in the mutable multilevel data structure other than the respective levels at which the two or more read-only data structures are located, wherein the single writable data structure includes a vertex table comprising a direct or indirect reference to one or more elements of the adjacency list for the given vertex, and wherein the vertex table of the other one of the two or more read-only data structures at the other level of the mutable multilevel data structure further includes one or more references to an edge table in the other one of the two or more read-only data structures at the other level.

6. The system of claim 3,
wherein the single writable data structure comprises information about one or more elements of the adjacency list for the given vertex;
wherein the graph processing module is further configured to create a new read-only data structure at a new level of the mutable multilevel data structure dependent on the information in the single writable data structure about the one or more elements of the adjacency list for the given vertex; and
wherein to create the new read-only data structure, the graph processing module is configured to:
copy to the new read-only data structure, for each vertex in the graph structure for which there is information about one or more elements of the adjacency list for the vertex in the single writeable data structure, including the given vertex, the entire adjacency list for the vertex; or
copy to the new read-only data structure, for each vertex in the graph structure for which there is information about one or more elements of the adjacency list for the vertex in the single writeable data structure, including the given vertex, only the elements of the adjacency list for the vertex that have been modified since the time that a most-recently created read-only data structure in the mutable multilevel data structure was created.

7. The system of claim 3,
wherein the single writeable data structure includes a vertex table comprising a direct or indirect reference to one or more elements of the adjacency list for the given vertex;
wherein to perform the computation on the graph structure, the graph processing module is further configured to create a new read-only data structure at a new level of the mutable multilevel data structure; and
wherein to create the new read-only data structure, the graph processing module is configured to:
determine, for each vertex in the graph structure for which there is information about one or more elements of the adjacency list for the vertex in the single writeable data structure, including the given vertex, whether to perform an operation to copy the entire adjacency list for the vertex to the new read-only data structure or an operation to copy to the new read-only data structure only the elements of the adjacency list for the vertex that have been modified since the time that a most-recently created read-only data structure in the mutable multilevel data structure was created; and
perform the determined copy operation;
wherein the determination is dependent on one or more of:
a configuration parameter value indicating selection of one of two or more supported copy policies; or
a comparison between a degree of the vertex and a pre-determined degree threshold value.

8. The system of claim 1, wherein to reconstruct the adjacency list for the given vertex, the graph processing module is configured to:
obtain a fragment of the adjacency list for the given vertex from one of the two or more read-only data structures, wherein the fragment of the adjacency list comprises a next pointer indicating another one of the two or more read-only data structures in which an immediately succeeding fragment of the adjacency list is stored: and
obtain the immediately succeeding fragment of the adjacency list from the other one of the two or more read-only data structures.

9. The system of claim 1,
wherein, at each given one of the respective levels in the mutable multilevel data structure at which one of the two or more read-only data structures is located other than the one of the two or more read-only data structures that comprises a consistent compressed sparse row representation of the graph structure at a given point in time, the vertex table comprises:
a respective entry referencing edge information in the edge table at the given level for each vertex in the graph structure for which a property or edge was modified between the time that the given level was created and the time that an immediately previous level in the mutable multilevel data structure was created; and
a respective entry referencing the vertex table at a previous level in the mutable multilevel data structure for each vertex in the graph structure for which no modification was made to a property or edge between the time that the given level was created and the time that an immediately previous level in the mutable multilevel data structure was created.

10. The system of claim 1,
wherein, at each given one of the respective levels in the mutable multilevel data structure at which one of the two or more read-only data structures is located other than the one of the two or more read-only data structures that comprises a consistent compressed sparse row representation of the graph structure at a given point in time, the vertex table comprises one or more of:
a deletion vector indicating, for each vertex in the graph structure for which a property or edge was modified between the time that the given level was created and the time that an immediately previous level in the mutable multilevel data structure was created, whether or not each edge of the vertex was deleted between the time that the given level was created and the time that an immediately previous level in the mutable multilevel data structure was created;
an adjacency list length for each vertex in the graph structure that is represented by an element in the vertex table; or
a directed or undirected vertex degree for each vertex in the graph structure that is represented by an element in the vertex table.

11. The system of claim 3,
wherein in response to receiving a request to modify the graph structure, the graph processing module is configured to update the mutable multilevel data structure; and
wherein to update the mutable multilevel data structure, the graph processing module is configured to modify a vertex table in the single writeable data structure to reflect one or more of:
an addition of a vertex to the graph structure;
a deletion of a vertex from the graph structure;
an addition of an edge to or from a vertex in the graph structure; or
a deletion of an edge to or from a vertex in the graph structure.

12. The system of claim 1,
wherein, at each given one of the respective levels in the mutable multilevel data structure at which one of the two or more read-only data structures is located other than the one of the two or more read-only data structures that comprises a consistent compressed sparse row representation of the graph structure at a given point in time, the vertex table comprises:
- a copy-on-write enabled indirection table, each element of which represents a vertex in the graph structure for which a modification has been made since the time at which an immediately previous level in the mutable multilevel data structure was created; and
- a plurality of data pages;

wherein each of the plurality of data pages comprises no more than a pre-determined maximum number of vertex table elements; and wherein each vertex table element contains a NIL value or a vertex object comprising a dynamically sized array indicating edges to or from a particular vertex in the graph structure that have been added or deleted since the time at which an immediately previous level in the mutable multilevel data structure was created.

13. The system of claim 1, wherein the graph processing module is further configured to:
- merge two of the two or more read-only data structures that are on adjacent levels of the mutable multilevel data structure to create a new read-only data structure;
- replace the two of the two or more read-only data structures with the new read-only data structure on one of the adjacent levels of the mutable multilevel data structure; and
- delete the other one of the adjacent levels of the mutable multilevel data structure.

14. The system of claim 1,
wherein the memory comprises a local system memory;
wherein the system further comprises a persistent memory component that stores the mutable multilevel data structure in its entirety;
wherein the mutable multilevel data structure is larger than an available portion of the local system memory; and
wherein to perform the computation on the graph structure, the system is configured to load one or more portions of the mutable multilevel data structure from the persistent memory component into the local system memory on an as-needed basis.

15. The system of claim 1,
wherein, at each given one of the respective levels in the mutable multilevel data structure at which one of the two or more read-only data structures is located, the edge table comprises a respective adjacency list for each vertex in the graph structure for which the vertex table at the given level comprises a respective entry referencing edge information in the edge table at the given level.

16. The system of claim 1,
wherein to perform the computation on the graph structure, the graph processing module is configured to:
- receive an information stream comprising a plurality of requests, each indicating one or more edges to be added to the graph structure or one or more edges to be deleted from the graph structure;
- advance a sliding window into the mutable multilevel data structure indicating a portion of the mutable multilevel data structure in which edge information or deletion vectors represented in the two or more read-only data structures of the mutable multilevel data structure are to be considered during the performance of the computation, wherein the sliding window comprises edge information for the one or more edges included in the most recently received request to add one or more edges to the graph structure or a deletion vector indicating the one or more edges included in the most recently received request to delete one or more edges from the graph structure; and
- reconstruct the adjacency list for the given vertex of the graph structure using only edge information or deletion vectors in the portion of the mutable multilevel data structure indicated by the sliding window; and wherein to advance the sliding window, the graph processing module is configured to designate a lowest level of the mutable multilevel data structure at which edge information or deletion vectors represented in the two or more read-only data structures of the mutable multilevel data structure are to be considered during the performance of the computation.

17. A method, comprising:
receiving a request to perform a computation on a graph structure, wherein the graph structure is represented by a mutable multilevel data structure stored in a memory; and
in response to said receiving, a graph processing module reconstructing an adjacency list for a given vertex of the graph structure from information stored in the mutable multilevel data structure that represents the graph structure;
wherein the mutable multilevel data structure comprises two or more read-only data structures that collectively represent a read-only snapshot of the graph structure, wherein one of the two or more read-only data structures at a given level of the mutable multilevel data structure comprises a consistent compressed sparse row representation of the graph structure at a given point in time, wherein each of the two or more read-only data structures is located at a respective level in the mutable multilevel data structure, wherein each of the two or more read-only data structures comprises a respective vertex table and edge table, and wherein another one of the two or more read-only data structures at another level of the mutable multilevel data structure includes a vertex table with one or more references to an edge table in the one read-only data structure at the given level; and
wherein to reconstruct the adjacency list for the given vertex, the graph processing module is configured to:
- traverse one or more of the two or more read-only data structures to obtain elements of the adjacency list for the given vertex; and
- add the obtained elements to the adjacency list for the given vertex.

18. The method of claim 17,
wherein the mutable multilevel data structure further comprises a single writeable data structure comprising information reflecting changes made to the graph structure that are not reflected in the two or more read-only data structures, wherein the single writable data structure and the two or more read-only data structures collectively represent a current state of the graph structure; and
wherein to reconstruct the adjacency list for the given vertex, the graph processing module is further configured to:

traverse the single writeable data structure to obtain one or more additional elements of the adjacency list for the given vertex; and add the additional obtained elements to the adjacency list for the given vertex.

19. A non-transitory, computer-readable storage medium storing program instructions that when executed on one or more computers cause the one or more computers to implement a graph processing module, wherein the graph processing module is configured to perform:

receiving a request to perform a computation on a graph structure, wherein the graph structure is represented by a mutable multilevel data structure stored in a memory; and in response to receiving the request, reconstructing an adjacency list for a given vertex of the graph structure from information stored in the mutable multilevel data structure that represents the graph structure;

wherein the mutable multilevel data structure comprises two or more read-only data structures that collectively represent a read-only snapshot of the graph structure, wherein one of the two or more read-only data structures at a given level of the mutable multilevel data structure comprises a consistent compressed sparse row representation of the graph structure at a given point in time, wherein each of the two or more read-only data structures is located at a respective level in the mutable multilevel data structure, wherein each of the two or more read-only data structures comprises a respective vertex table and edge table, and wherein another one of the two or more read-only data structures at another level of the mutable multilevel data structure includes a vertex table with one or more references to an edge table in the one read-only data structure at the given level.

20. The non-transitory, computer-readable storage medium of claim 19, wherein the mutable multilevel data structure further comprises a single writeable data structure comprising information reflecting changes made to the graph structure that are not reflected in the two or more read-only data structures, wherein the single writable data structure and the two or more read-only data structures collectively represent a current state of the graph structure;

wherein the graph processing module is further configured to perform creating a new read-only data structure at a new level of the mutable multilevel data structure;

wherein creating the new read-only data structure comprises, for each vertex in the graph structure for which there is information about one or more elements of the adjacency list for the vertex in the single writeable data structure:

determining whether to perform an operation to copy the entire adjacency list for the vertex to the new read-only data structure or an operation to copy to the new read-only data structure only the elements of the adjacency list for the vertex that have been modified since the time that a most-recently created read-only data structure in the mutable multilevel data structure was created; and performing the determined copy operation;

wherein the determining is dependent on one or more of:

a configuration parameter value indicating selection of one of two or more supported copy policies; or a comparison between a degree of the vertex and a pre-determined degree threshold value.

\* \* \* \* \*